United States Patent
Won et al.

(10) Patent No.: US 9,465,514 B2
(45) Date of Patent: Oct. 11, 2016

(54) METHOD AND APPARATUS FOR PROVIDING A CHANGED SHORTCUT ICON CORRESPONDING TO A STATUS THEREOF

(71) Applicant: Samsung Electronics Co., Ltd., Gyeonggi-do (KR)

(72) Inventors: Sung-Joon Won, Gyeonggi-do (KR); Jae-Yoon Chong, Seoul (KR)

(73) Assignee: Samsung Electronics Co., Ltd (KR)

( * ) Notice: Subject to any disclaimer, the term of this patent is extended or adjusted under 35 U.S.C. 154(b) by 209 days.

(21) Appl. No.: 14/224,643

(22) Filed: Mar. 25, 2014

(65) Prior Publication Data

US 2014/0317527 A1   Oct. 23, 2014

(30) Foreign Application Priority Data

Apr. 22, 2013 (KR) .................. 10-2013-0044307

(51) Int. Cl.
*G06F 13/00* (2006.01)
*G06F 15/00* (2006.01)
*G06F 3/0481* (2013.01)
*G06F 3/0488* (2013.01)
*G06F 3/0489* (2013.01)

(52) U.S. Cl.
CPC ....... *G06F 3/04817* (2013.01); *G06F 3/04883* (2013.01); *G06F 3/04897* (2013.01)

(58) Field of Classification Search
CPC . H04M 1/72544; G06F 3/0482; G06F 3/041
USPC .......... 715/761–765, 840, 851–855
See application file for complete search history.

(56) References Cited

U.S. PATENT DOCUMENTS

| | | | |
|---|---|---|---|
| 8,965,459 B2* | 2/2015 | Lee | H04M 1/72544 348/14.07 |
| 2008/0074399 A1* | 3/2008 | Lee | G06F 3/0482 345/173 |
| 2008/0168396 A1* | 7/2008 | Matas | G01C 21/3664 715/840 |
| 2012/0151415 A1 | 6/2012 | Park et al. | |
| 2013/0082965 A1 | 4/2013 | Wada et al. | |
| 2013/0201144 A1* | 8/2013 | Miura | G06F 3/041 345/173 |

FOREIGN PATENT DOCUMENTS

| | | |
|---|---|---|
| GB | 2481464 | 12/2011 |
| WO | WO 2012/053516 | 4/2012 |

OTHER PUBLICATIONS

Richard Lawler, "Netflix Extends New User Interface Experience to Android Phones", XP055140173, Sep. 24, 2012.
"Iphone Messages Automatically Open When I Don't Want Them To—MacRumors Forums", XP055140204, Nov. 13, 2012.
European Search Report dated Feb. 3, 2015 issued in counterpart application No. 14164794.1-1959.

* cited by examiner

*Primary Examiner* — Kevin Nguyen
(74) *Attorney, Agent, or Firm* — The Farrell Law Firm, P.C.

(57) ABSTRACT

A method of controlling a mobile apparatus which provides a changed shortcut icon corresponding to a status of the mobile apparatus is provided. The method includes displaying a shortcut icon, corresponding to a function in the mobile apparatus, on a display unit; recognizing the status of the mobile apparatus; changing an initial entry point of the shortcut icon to a changed entry icon as a function of the status; detecting an execution gesture for executing the shortcut icon; and executing the function using the changed entry point when the execution gesture is detected.

18 Claims, 20 Drawing Sheets

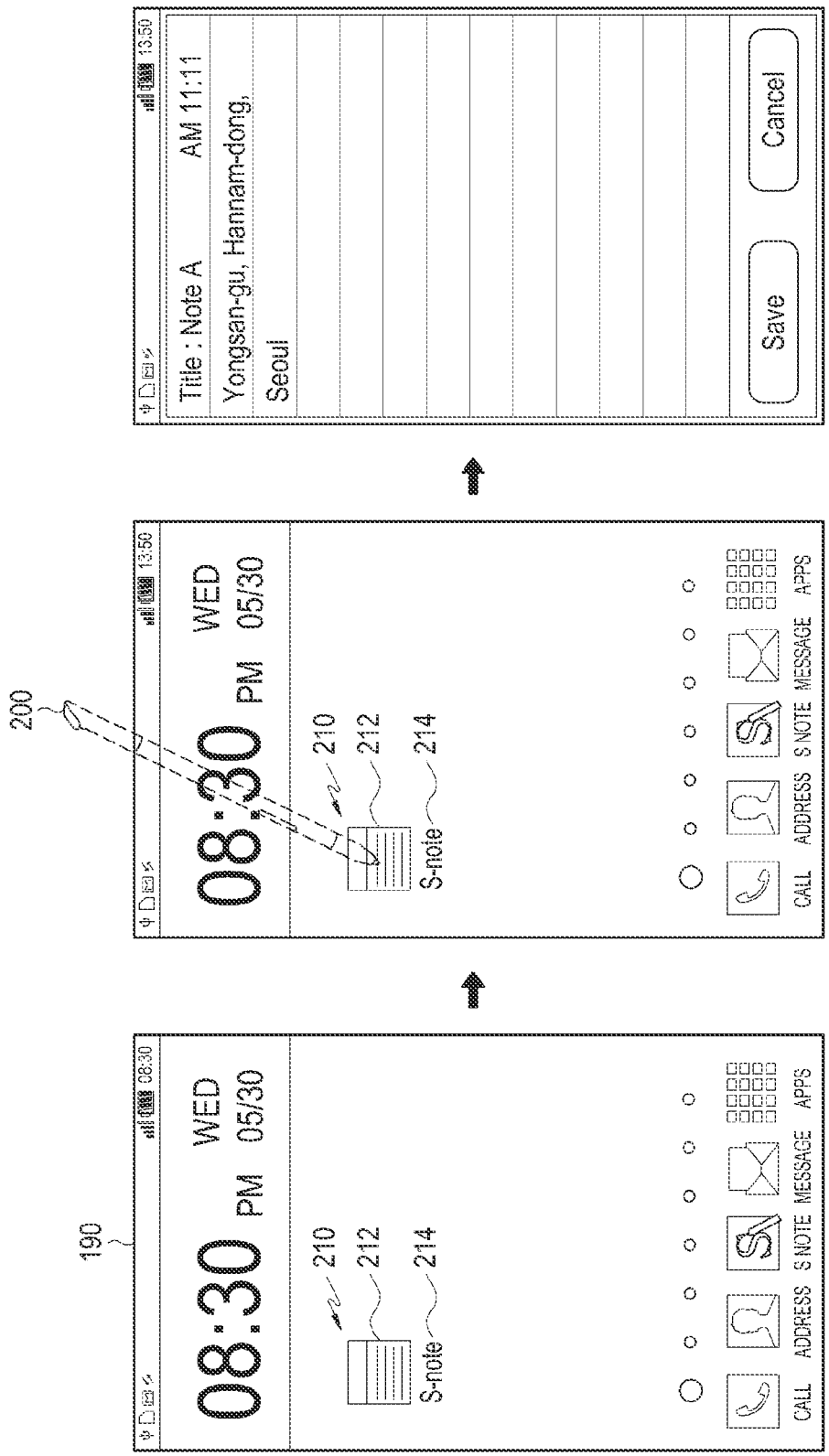

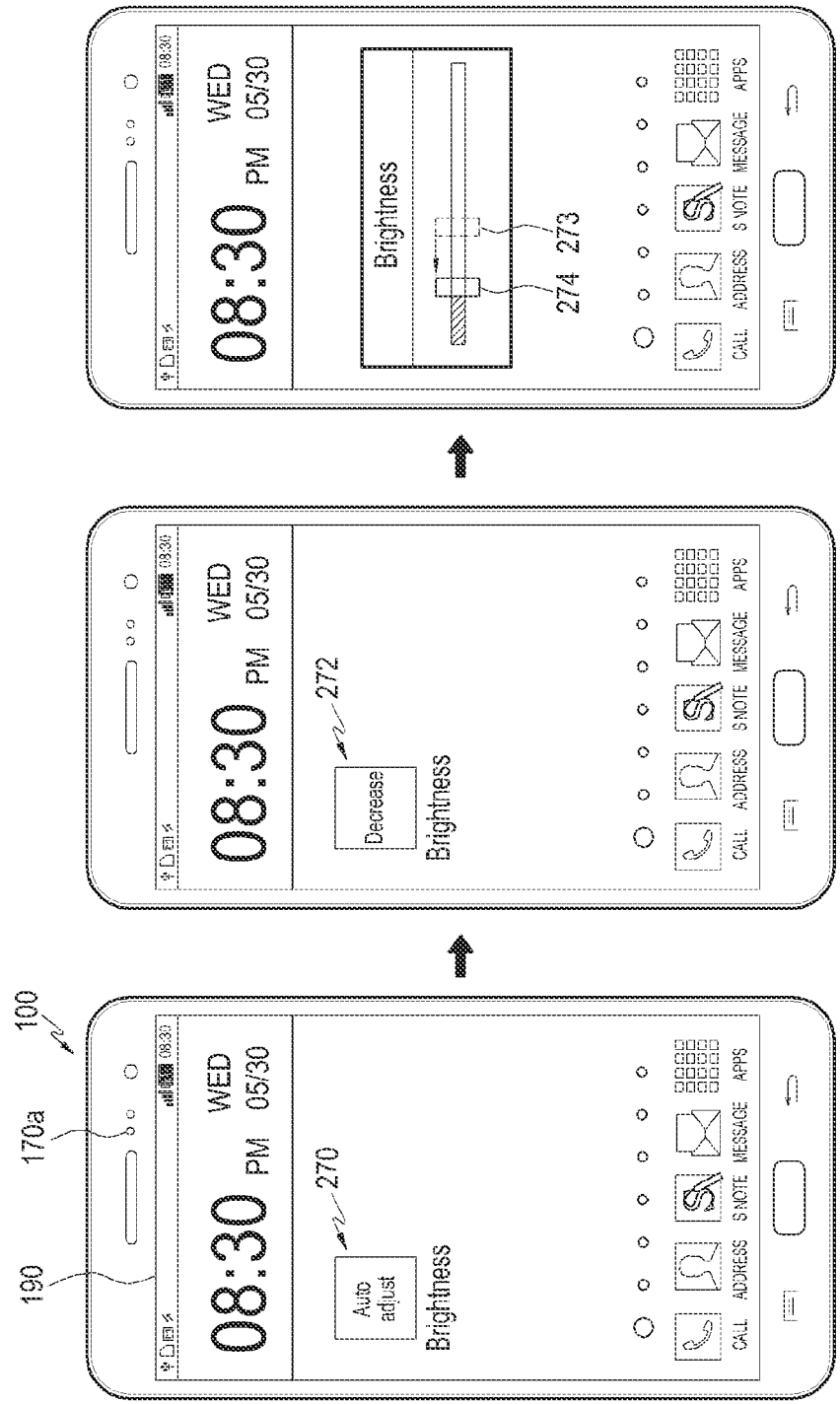

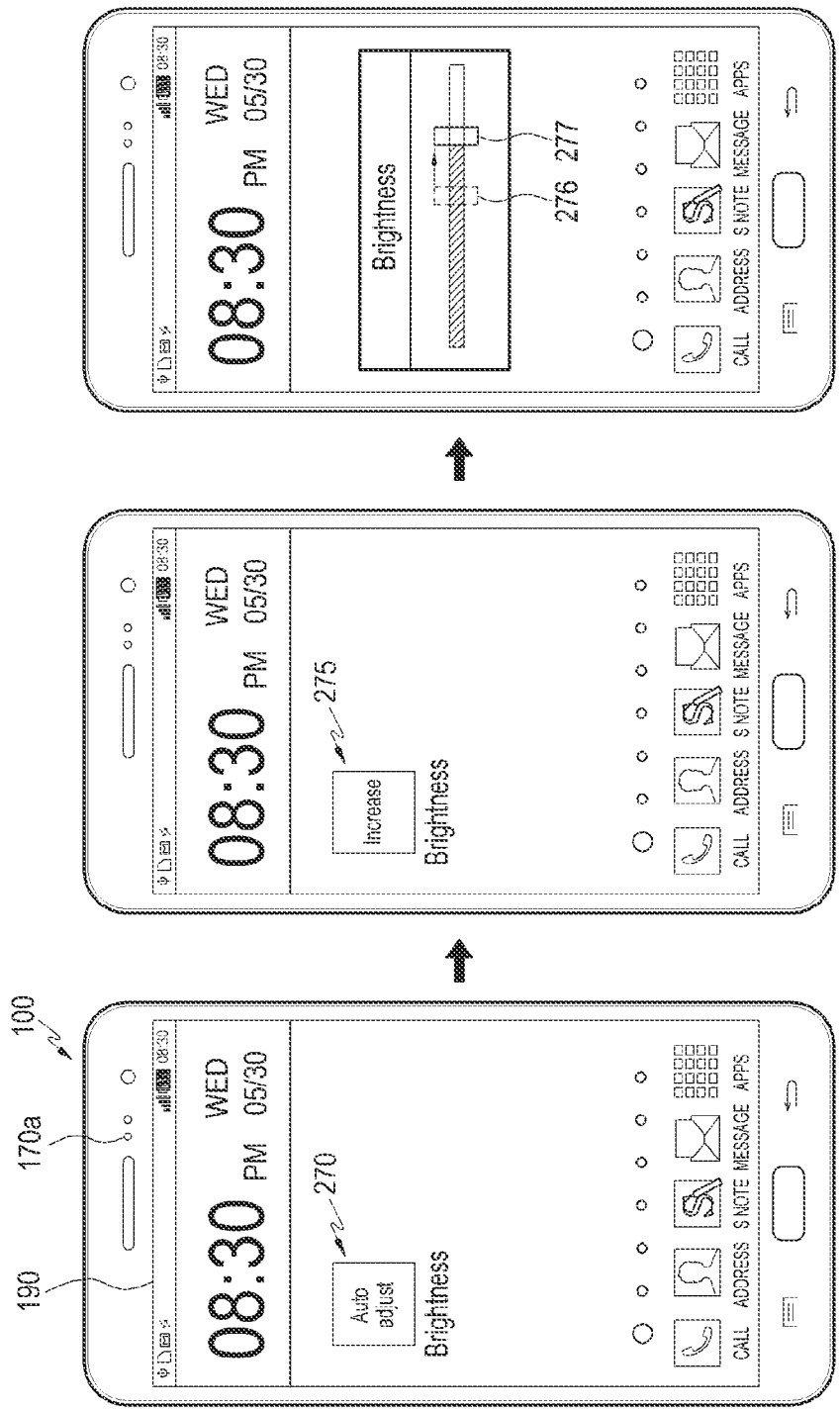

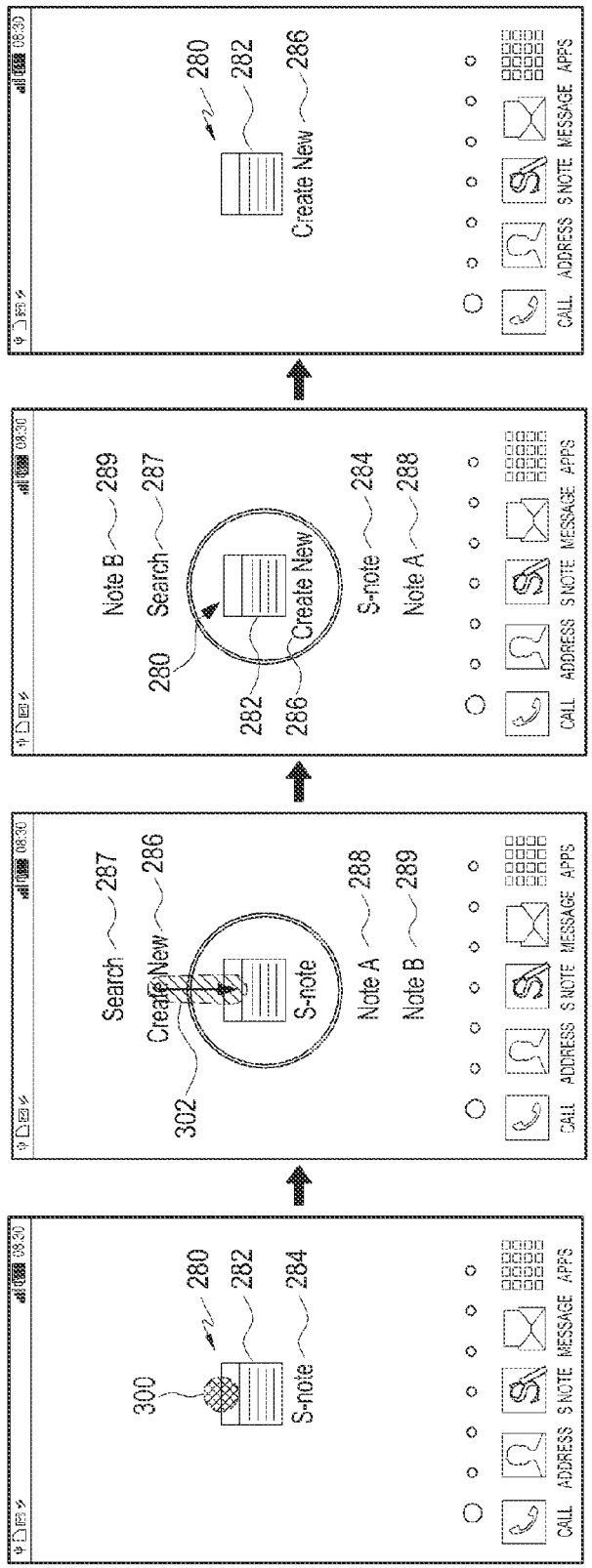

METHOD AND APPARATUS FOR PROVIDING A CHANGED SHORTCUT ICON CORRESPONDING TO A STATUS THEREOF

PRIORITY

This application claims priority under 35 U.S.C. §119(a) to Korean Application Serial No. 10-2013-0044307, which was filed in the Korean Intellectual Property Office on Apr. 22, 2013, the entire content of which is incorporated herein by reference.

BACKGROUND OF THE INVENTION

1. Field of the Invention

The present invention generally relates to a mobile apparatus and a method of controlling the same, and for example, to shortcut icons of a mobile apparatus.

2. Description of the Related Art

Recently, mobile apparatuses have been rapidly developing. The mobile apparatus is presently capable of executing various functions to provide useful services to a user.

A display unit of the mobile apparatus can display shortcut icons that correspond to the various functions. When a shortcut icon is selected, the function corresponding to the shortcut icon is executed. Accordingly, a role of the shortcut icon is to execute the function.

However, the shortcut icon generally has no other role except for the execution of the function.

SUMMARY OF THE INVENTION

The present invention has been made to address at least the problems and disadvantages described above, and to provide at least the advantages described below. Accordingly, aspects of the present invention provide a mobile apparatus and a method of controlling the same, which are capable of executing a function using a changed entry point corresponding to a status of a mobile apparatus.

In accordance with an aspect of the present invention, a method of controlling a mobile apparatus to provide a changed shortcut icon corresponding to a status thereof is provided. The method includes displaying a shortcut icon, which corresponds to a function of the mobile apparatus, on a display unit; determining the status of the mobile apparatus; changing an initial entry point of the shortcut icon to a changed entry icon in correspondence with the status; detecting an execution gesture that executes the shortcut icon; and executing the function by the changed entry point when the execution gesture is detected.

In accordance with another aspect of the present invention, a mobile apparatus configured to provide a changed shortcut icon corresponding to a status thereof is provided. The apparatus includes a controller configured to control a display unit to display a shortcut icon, which corresponds to a function of the mobile apparatus, to determine the status of the mobile apparatus, to change an initial entry point to a changed entry point according to the status, to detect a gesture for an execution of the shortcut icon, and to execute the function by the changed entry point when the execution gesture is detected; and the display unit configured to display the shortcut icon.

BRIEF DESCRIPTION OF THE DRAWINGS

The above and other aspects, features, and advantages of the present invention will be more apparent from the following detailed description taken in conjunction with the accompanying drawings, in which:

FIGS. 15A, 15B, 15C, 16A, 16B and 16C are views showing screens in which a method of controlling a mobile apparatus providing a changed shortcut icon corresponding to a status of the mobile apparatus is executed according to another embodiment of the present invention;

FIGS. 17A, 17B, 17C, 18A, 18B and 18C are views showing screens in which a method of controlling a mobile apparatus providing a changed shortcut icon corresponding to a status of the mobile apparatus is executed according to another embodiment of the present invention;

FIGS. 20A, 20B, 20C, and 20D are views showing screens in which the method of controlling the mobile apparatus providing the changed shortcut icon corresponding to the status of the mobile apparatus is executed according to another embodiment of the present invention.

DETAILED DESCRIPTION OF EMBODIMENTS OF THE PRESENT INVENTION

The embodiments of the present invention will be described with reference to the accompanying drawings. However, it will be noted that the present invention should not be limited to the embodiments, and it will be understood that the present invention includes changes, equivalents, and substitutions belonging to the spirit and the technical scope of the present invention.

Terms, including ordinal numerals such as first, second, and the like, may be used to illustrate various structural elements, but are not intended to limit the structural elements. These terms are only used to distinguish one structural element from another structural element. For example, without departing from the scope of the present invention, a first structural element can be referred to as a second structural element, and similarly the second structural element can be referred to as the first structural element. A term 'and/or' indicates a combination of plural described elements, or any one of a plurality of described elements.

Terms used in the present description are merely used to describe an embodiment, and are not intended to limit the scope of the present invention. A singular expression may include a plural expression unless otherwise explicitly stated. It should be understood that in the present specification, the terms "include" or "has/have" expresses an existence of a characteristic, a numeral, a process, an operation, a structural element, a part, and/or a combination thereof, and they do not exclude the existence of one or more other characteristics, numerals, processes, operations, structural elements, parts and the combinations thereof, or any other additional possibility.

Unless otherwise explicitly defined, it should be understood that all terms include technical terms and scientific terms, which are used herein, and have the same meanings as those known to a person skilled in a technical field to which the present invention belongs.

Figure 1:
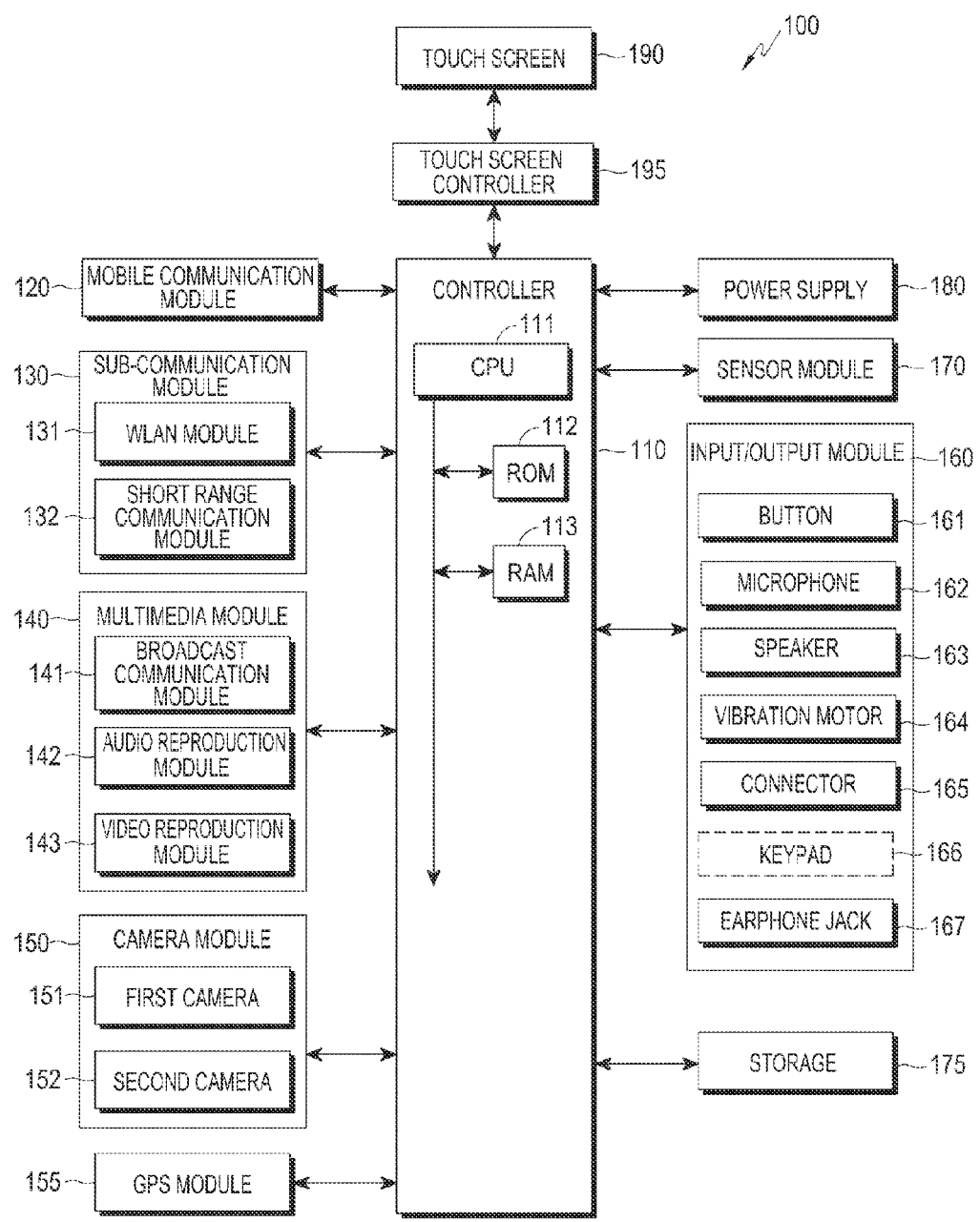
FIG. 1 is a schematic block diagram illustrating a mobile apparatus according to an embodiment of the present invention.

FIG. 1 is a schematic block diagram illustrating a mobile apparatus according to an embodiment of the present invention.

Referring to FIG. 1, the mobile apparatus 100 can be connected with an external apparatus (not shown) by using connections means such as, for example, a sub-communication module 130, a connector 165, and an earphone jack 167. The "external apparatus" may include various apparatuses such as, for example, an earphone, an external speaker, an Universal Serial Bus (USB) memory, an electric charger, a cradle, a docking station, a DMB antenna, a payment apparatus, a blood-sugar test apparatus, a gaming console box, a vehicle navigation, and the like, which are detachably mounted on or connected by wire or wirelessly to the mobile apparatus 100. Further, the "external apparatus" may include a Near Field Communication (NFC) apparatus such as a Bluetooth communication module and a NFC module which are connected by wireless near field communication to the mobile apparatus 100, a WiFi direct communication apparatus, or a wireless access point. Further, the external apparatus may include another apparatus such as, for example, a portable phone, a smart phone, a tablet PC, a desktop PC, and a server.

The mobile apparatus 100 may be, for example, a tablet, a desktop PC, a smart TV, a notebook, a music player, an MP3 player, and the like.

Referring to FIG. 1, the mobile apparatus 100 includes a display unit such as, for example, a touch screen 190, and a display unit controller, such as, for example, touch screen controller 195. Further, the mobile apparatus 100 includes a controller 110, a mobile communication module 120, a sub-communication module 130, a multimedia module 140, a camera module 150, a GPS module 155, an input/output module 160, a sensor module 170, a storage unit 175, and an electric power supply unit 180. The sub-communication module 130 includes at least one of a wireless LAN module 131 and a near field communication module 132. The multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, and an earphone connecting jack 167.

The controller 110 includes a CPU 111, a ROM 112, in which a control program for controlling the mobile apparatus 100 is stored, and a RAM 113 for storing signals an/or external data input or used as a memory area for an operation executed in the mobile apparatus 100. The CPU 111 includes a single core, a dual core, a triple core, and/or a quad core processor. The CPU 111, the ROM 112, and the RAM 113 may be mutually connected to one another through an internal bus.

The controller 110 controls the mobile communication module 120, the sub-communication module 130, the multimedia module 140, the camera module 150, the GPS module 155, the input/output module 160, the sensor module 170, the storage unit 175, the electric power supply unit 180, the touch screen 190, and the touch screen controller 195.

Under the control of the controller 110, the mobile communication module 120 allows the mobile apparatus 100 to be connected to an external apparatus through a mobile communication by using one or more antennas (not shown). The mobile communication module 120 transmits and receives a voice call, an image communication, a Short Message Service (SMS), or a Multimedia Message Service (MMS) to/from a portable phone (not shown), a smart phone (not shown), a tablet PC or other devices (not shown), which have a phone number input into the mobile apparatus 100.

The sub-communication module 130 includes at least one of the wireless LAN module and the NFC module. For example, the sub-communication module 130 may only include the wireless LAN module 131 or the NFC module 132, or may include both the wireless LAN module 131 and the NFC module 132.

The wireless module 131 can connect to the Internet at a location where a wireless access point (not shown) is installed, under the control of the controller 110. The wireless LAN module 131 supports a wireless LAN provision (IEEE802.11x) of the Institute of Electrical and Electronics Engineers (IEEE). The NFC module 132 can support a wireless NFC communication between the mobile apparatus 100 and another apparatus such as, for example, an image forming apparatus (not shown), under the control of the controller 110. The near field communication scheme may include, for example, a Bluetooth communication, an Infrared data association (IrDA) communication, a WiFi-direct communication, a Near Field Communication (NFC), and the like.

The mobile apparatus 100 includes at least one of the mobile communication module 120, the wireless LAN module 131, and the NFC module 132 according to its performance requirements. For example, the mobile apparatus 100 may include a combination of the mobile communication module 120, the wireless LAN module 131 and the NFC module 132 according to its performance requirements.

The multimedia module 140 includes the broadcasting module 141, the audio reproduction module 141, and/or the video reproduction module 143. Under the control of the controller 110, the broadcasting module 141 can receive broadcasting signals such as, for example, TV broadcasting signals, radio signals, or data broadcasting signals, and additional broadcasting information such as, for example an Electronic Program Guide or an Electronic Service Guide, which are transmitted from a broadcasting station through a broadcasting communication antenna (not shown). The audio reproduction module 142 can reproduce digital audio files such as, for example, files which have a file extension such as mp3, wma, ogg, and wav, which are stored therein or received from an external apparatus, under the control of the controller 110. The video reproduction module 143 can reproduce digital video files such as, for example, files which have a file extension such as mpeg, mpg, mp4, avi, mov, or mkv, which are stored therein or received from an external apparatus. The video reproduction module 143 may also reproduce digital audio files. The multimedia module 140 may instead include the audio reproduction module 142 and the video reproduction module 143, but not the broadcasting communication module 141. Further, the audio reproduction module 142 or the video reproduction module 143 of the multimedia module 140 may instead be included in the controller 110. The camera module 150 includes at least one of the first camera 151 and the second camera 152 which can photograph a stationary image or moving pictures, under the control of the controller 110. Further, the first camera 151 and/or the second camera 152 may include an auxiliary light source such as, for example a flash (not shown), which provides an amount of light necessary for photographing. The first camera 151 may be disposed on a front surface of the mobile apparatus 100, while the second camera 152 may be disposed on a rear surface of the mobile apparatus 100. Alternatively, the first camera 151 and the second camera 152 may be adjacently arranged so as to photograph a three-dimensional stationary image or three-dimensional moving pictures (for example, a distance between the first and second cameras 151 and 152 may be larger than 1 cm, and smaller than 8 cm).

The GPS module 155 receives electronic waves from a plurality of GPS satellites (not shown) in Earth's orbit, and calculates a location of the mobile apparatus by using Time of Arrival from a GPS satellite to the mobile apparatus 100.

The input/output module 160 may include at least one button 161, the microphone 162, the speaker 163, the vibration motor 164, the connector 165, and a keypad 166.

The buttons 161 may be formed on a front surface, a side, or a rear surface of a housing for the apparatus 100, and may include at least one of an electric power source/a lock button, a volume button, a menu button, a back button, and a search button.

The microphone 162 receives voice and/or sound input under the control of the controller 110, so as to generate electronic signals.

Under the control of the controller 110, the speaker 163 can output sounds, which correspond to various signals such as, for example, radio signals, broadcasting signals, digital audio files, digital video files, and photographing, of the mobile communication module 120, the sub-communication module 130, the multimedia module 140, and/or the camera module 150. The speaker 163 may also output sound such as, for example, a button operation sound and/or a ringtone, corresponding to a function executed by the mobile apparatus 100. One or more speakers 163 may be mounted at suitable positions on a housing of the mobile apparatus 100.

The vibration motor 164 can convert an electronic signal into a mechanical vibration under the control of the controller 110. For example, in a state in which the mobile apparatus is in a vibration mode, when the mobile apparatus 100 receives a voice call from another apparatus (not shown), the vibration motor 164 operates. One or more vibration motors 164 may be mounted in the housing of the mobile apparatus 100. The vibration motor 164 may also operate in response to a touch operation of a user which touches the touch screen 190 formed and a continuous touch of a user which maintains a touch on the touch screen 190.

The connector 165 may serve as an interface for connecting the mobile apparatus 100 to an external apparatus (not shown) or an electric power source (not shown). Under the control of the controller 110, the mobile apparatus 100 transmits data stored in the storage unit 175 thereof to an external apparatus (not shown), and/or receives data from an external apparatus (not shown), through a wired-cable connected to the connector 165. The external apparatus may be, for example, a docking station, and the data may be input signals transmitted from an external input apparatus such as, for example, a mouse, a keyboard, and the like. Further, the mobile apparatus 100 is supplied with electric power from an electric power source (not shown) through the wired-cable connected to the connector 165, or a battery that can be charged by using the electric power source.

The keypad 166 receives a key input from the user in order to control the mobile apparatus 100. The keypad 166 may include a physical keypad (not shown) formed on the mobile apparatus 100, and/or a virtual keypad (not shown) displayed on the touch screen 190. The physical keypad (not shown) may be omitted from the mobile apparatus 100 according to the performance or structure of the mobile apparatus 100.

The earphone connecting jack 167 can receive an earphone (not shown) inserted therein to connect to the mobile apparatus 100.

The sensor module 170 includes at least one sensor for detecting a status of the mobile apparatus 100. For example, the sensor module 170 may include, for example, a proximity sensor for detecting an absence or a presence of a user's proximity to the mobile apparatus 100, and/or an illuminance sensor for detecting an amount of light surrounding the mobile apparatus 100. The sensor module 170 may also include a gyro sensor. The gyro sensor can detect an operation of the mobile apparatus 100 such as, for example, a rotation of the mobile apparatus 100, an acceleration or vibration applied to the mobile apparatus 100, a cardinal direction by using a magnetic field, and an operation direction of the gravity. The sensor module 170 may also include an altimeter for measuring atmospheric pressure to detect an altitude. At least one sensor detects the status of the mobile apparatus, and generates a signal corresponding to the detected status to transmit to the controller 110. Sensors may be added to or removed from the sensor module 170 according to the performance requirements of the mobile apparatus 100.

Under the control of the controller 110, the storage unit 175 can store signals or data, which are input/output to correspond to an operation of the mobile communication module 120, the sub-communication module 130, the multimedia module 140, the camera module 150, the GPS module 155, the input/output module 160, the sensor module 170, and/or the touch screen 190, therein. The storage unit 175 can store a control program and applications for the control of the mobile apparatus 100 or the controller 110.

The term "storage unit" refers to the storage unit 175, the ROM 112, the RAM 113, or a memory card (not shown) such as, for example, a Secure Digital (SD) card and a memory stick, which is inserted into the mobile apparatus 100. The storage unit may also include a non-volatile memory, a volatile memory, a hard disc drive (HDD) and/or a solid state drive (SSD).

The electric power supply unit 180 can supply one or more batteries (not shown), which are arranged in the housing of the mobile apparatus 100, with electric power. Further, the electric power supply unit 180 can supply the mobile apparatus 100 with electric power input from an external electric power source (not shown) through a wired-cable connected to the connector 165. Furthermore, the electric power supply unit 180 can supply the mobile apparatus 100 with electric power input from an external electric power source through wireless charging.

As noted above, the display unit may include a touch screen 190. The touch screen 190 is configured to provide a user interface corresponding to various services such as, for example, a voice call, a transmission of data, a broadcasting, and a photographing. The touch screen 190 can transmit an analog signal, which corresponds to at least one touch input to the user interface, to the touch screen controller 195. The touch screen 190 receives at least one touch which is input by a user's body such as, for example, fingers including a thumb, or a touch input means such as, for example, an electronic pen and/or a stylus pen. Further, the touch screen 190 can receive a continuous movement of one touch among touches. The touch screen 190 can transmit an analog signal corresponding to a continuous movement of an touch input to the touch screen controller 195.

In the present invention, the touch is not limited to a contact of a user's body with the touch screen 190, or a contact of a touchable input means with the touch screen 190, and may instead include a noncontact touch. A distance, which the touch screen can detect, is variable according to the performance or structure of the mobile apparatus.

Further, the controller 110 can detect a variety of user inputs which are received through the camera module 150, the input/output module 160, the sensor module 170, and the like, as well as the touch screen 190. The user's inputs include information such as, for example, gestures, voice, movement of eyes and a body signal of the user, which is input to the mobile apparatus 100 in various forms. The controller 110 controls the mobile apparatus 100 to execute a predetermined operation or function which corresponds to the detected user's input.

The touch screen 190 can be embodied in a resistive scheme, a capacitive scheme, an Electronic Magnetic Resonance (EMR) scheme, an infrared scheme, or an acoustic wave scheme. The touch screen 190 also may be embodied in a combination of one or more schemes.

The touch screen controller 195 converts an analog signal, which is received from the touch screen 190, into a digital signal such as, for example, an X coordinate and a Y coordinate, and transmits it to the controller 110. The controller 110 can control the touch screen 190 by using the digital signal which is received from the touch screen controller 195. For example, the controller 110 enables the touch screen controller 195 to select a shortcut icon (not shown) displayed on the touch screen 190 or to execute the shortcut icon (not shown) in response to the touch. Further, the touch screen controller 195 may be included in the controller 110.

Figure 2:
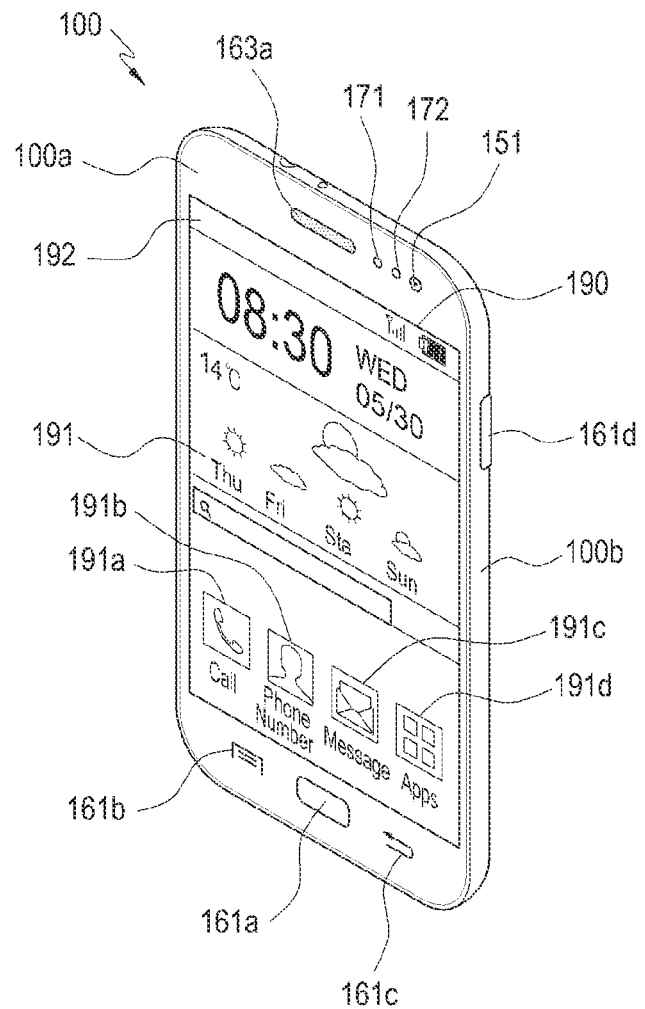
FIG. 2 is a front side view illustrating the mobile apparatus according to an embodiment of the present invention.

FIG. 2 is a perspective view illustrating the mobile apparatus according to an embodiment of the present invention, which is shown in view of a front side of the mobile apparatus 100.

Referring to FIG. 2, the mobile apparatus 100 includes the touch screen 190 at a center portion of the front surface 100a thereof. The touch screen 190 is formed to occupy most of the front surface 100a of the mobile apparatus 100. In FIG. 2, a main home screen is displayed on the touch screen 190 as an example. The main home screen is a first screen displayed on the touch screen 190, when the mobile apparatus 100 is turned on. Further, where the mobile apparatus 100 has many home screens of several pages, which are different from one another, the main home screen may be a first home screen among the home screens of the several pages. In the home screen, shortcuts 191a, 191b, and 191c for executing frequently used applications, an application change key 191d, time, weather, and the like can be displayed. The application change key 191d displays application icons identifying the applications on the touch screen 190. Further, a status bar 192, indicating the status of the mobile apparatus 100, such as, for example, a charging status of a battery, an intensity of a received signal, and a present time, may be displayed on an upper end of the touch screen 190.

A home button 161a, a menu button 161b, and a return button 161c are arranged at a lower end of the touch screen 190.

The home button 161a is used to display the main home screen on the touch screen 190. For example, in a state in which any home screen, different from the main home screen, or a menu screen is displayed on the touch screen 190, when the home button 161a is pressed or touched, the main home screen is displayed on the touch screen 190. Furthermore, when the home button 161a is pressed or touched during an execution of the applications on the touch screen 190, the main home screen shown in FIG. 2 may be displayed on the touch screen 190. Also, the home button 161a is used to display the applications which have recently been used, on the touch screen 190, or to display a task manager.

The menu button 161b provides a connection menu used on the touch screen 190. The connection menu may include, for example, a menu for adding widgets, a menu for changing a background screen, a menu for a search, an editing menu, a menu for setting a property, and the like. In the execution of the application, a connection menu connected to the application can be provided.

The return button 161c displays a screen which was previously displayed before the present screen was displayed, and terminates the execution of the latest application.

The mobile apparatus 100 has the first camera 151, the illuminance sensor 171, and the proximity sensor 172 arranged at an edge on the front surface 100a thereof. In addition, the mobile apparatus 100 may include the second camera 152, the flash 153, and the speaker 163 arranged on the rear surface 100c thereof (See FIG. 3).

On a surrounding edge 100b of the mobile apparatus 100, an electric power supply/reset button 161d, a volume control button 161e, a terrestrial DMB antenna for receiving a broadcasting, one or more microphones 162, and the like are arranged. The DMB antenna is fixed to, or detachably installed to the mobile apparatus 100.

Further, the mobile apparatus 100 may have the connector 165 formed at a side of a lower end thereof. The connector 165 may have a plurality of electrodes formed therein, which can be connected to an external apparatus by a wired cable. The earphone connecting jack 167 may be formed at a side of an upper end of the mobile apparatus 100. An earphone can be inserted in the earphone connecting jack 167.

Figure 3:
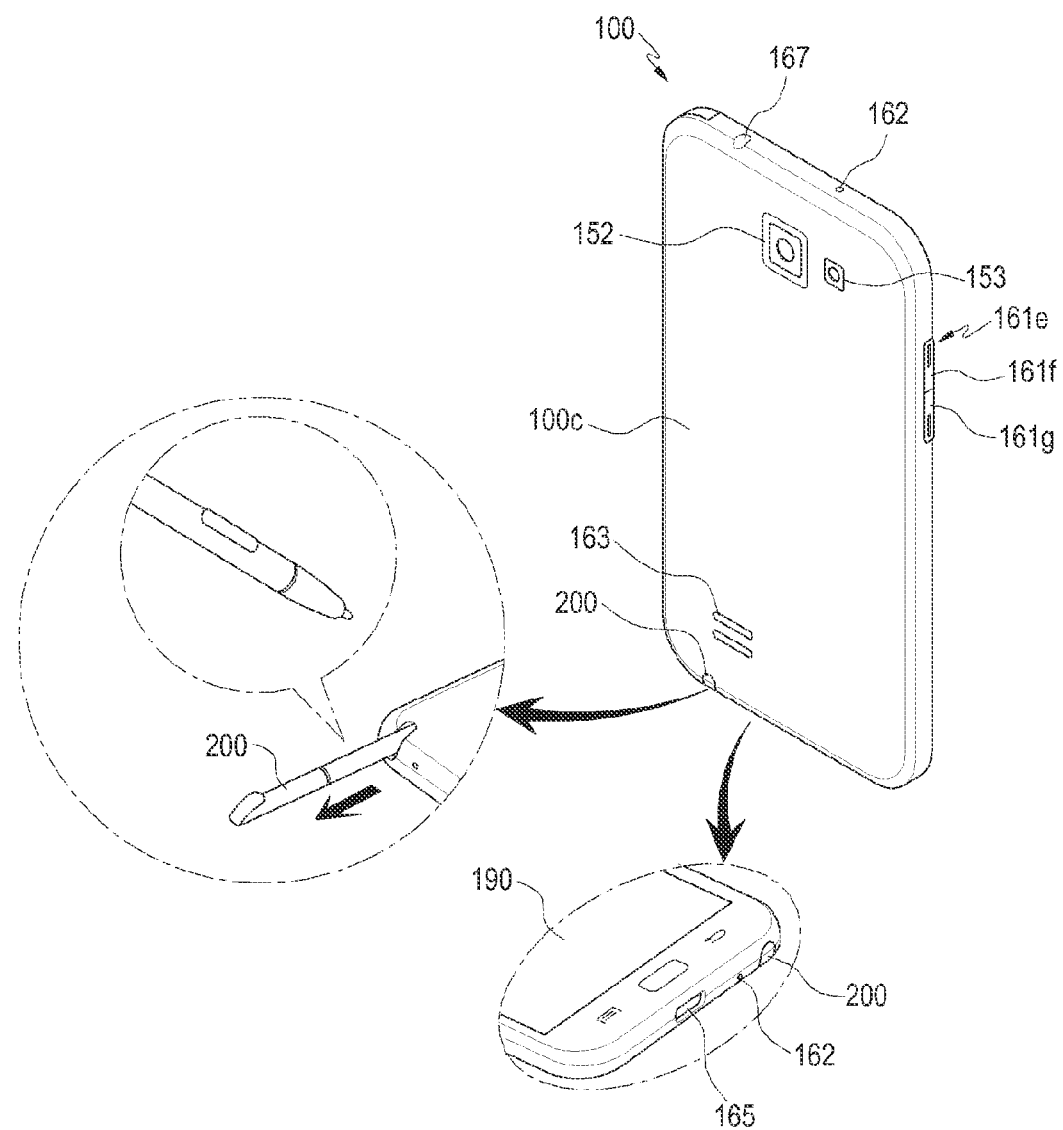
FIG. 3 is a rear side view illustrating the mobile apparatus according to an embodiment of the present invention.

Referring to FIG. 3, the second camera 152 and the flash 153 are arranged on an upper portion of the rear surface 100c of the mobile apparatus 100. The mobile apparatus 100 has the connector 165 formed at a lower side of the surrounding edge 100b. The connector 165 has a plurality of electrodes formed therein, which can be connected to an external apparatus by a wired cable. The earphone connecting jack 167 is formed at an upper side of the surrounding edge 100b. An earphone can be inserted in the earphone connecting jack 167

Furthermore, the mobile apparatus 100 includes a recess which is formed at lower side of the surrounding edge 100b and in which a touchable input means 200 such as, for example, an electronic pen or a stylus pen, can be inserted. The touchable input means 200 is separate from the mobile apparatus 100 and is inserted in the recess.

Figure 4:
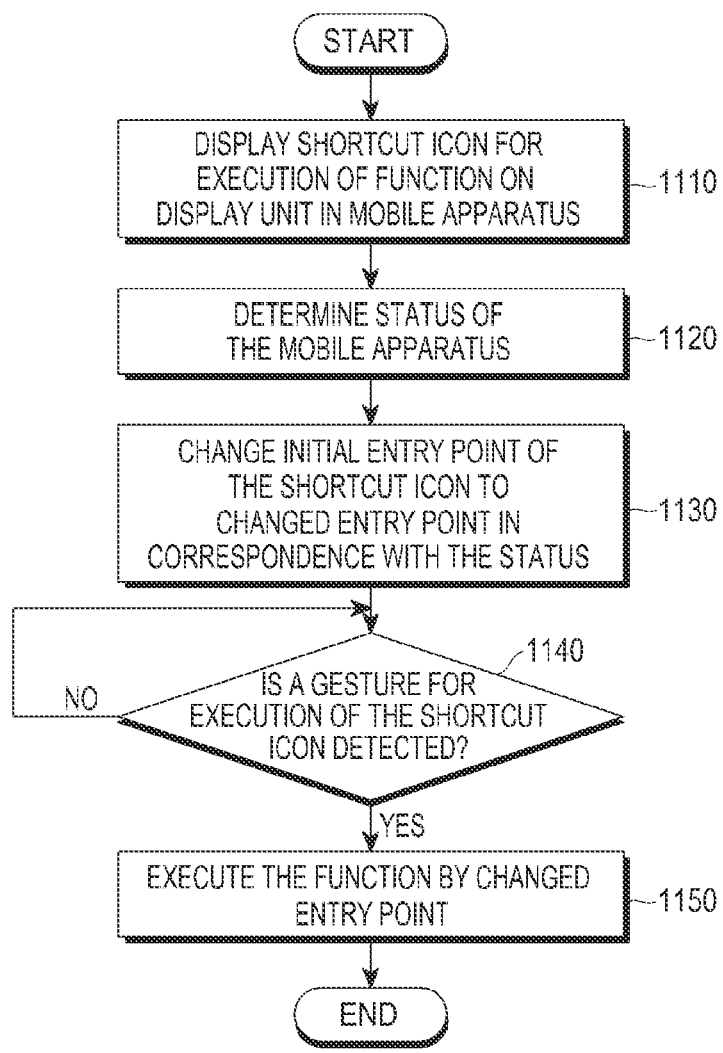
FIG. 4 is a flowchart illustrating a method of controlling a mobile apparatus to provide a changed shortcut icon corresponding to a status of the mobile apparatus according to an embodiment of the present invention.

FIG. 4 is a flowchart illustrating a method of controlling a mobile apparatus which provides a changed shortcut icon corresponding to a status of the mobile apparatus according to an embodiment of the present invention. FIGS. 5A to 5D are views showing screens in which the method of controlling the mobile apparatus providing the changed shortcut icon corresponding to the mobile apparatus is executed according to the embodiment of the present invention.

Figure 5:
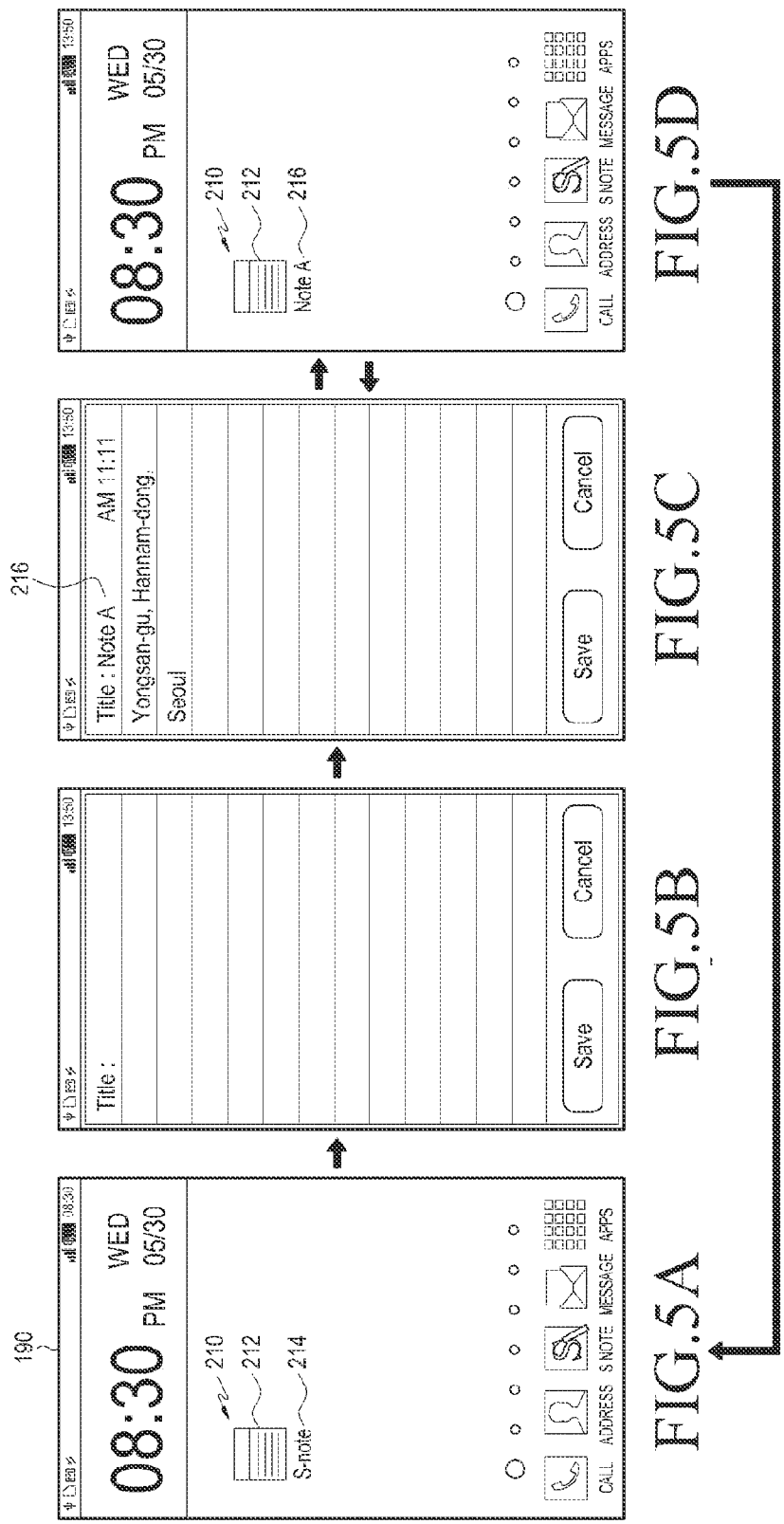
FIGS. 5A, 5B, 5C and 5D are views showing screens in which the method of controlling the mobile apparatus providing a changed shortcut icon corresponding to the mobile apparatus is executed according to an embodiment of the present invention.

Referring to FIG. 4, in step 1110, a shortcut icon corresponding to a function of the mobile apparatus is displayed. The controller 110 of the mobile apparatus 100 can display the shortcut icon, which is used for executing the function, on the display unit. The function may be, for example, an application. The application is a program created to perform a predetermined task. The shortcut icon refers to an icon displayed to execute the function. For example, the shortcut icon may be an icon displayed on the home screen in order to execute the application. Referring to FIG. 5A, the controller 110 displays a shortcut icon 210, which is used to execute a Note application, on the touch screen 190. At this time, the controller 110 can display the shortcut icon 210, which is used to execute the Note application, in the home screen on the touch screen 190.

In step 1120, the status of the mobile apparatus 100 may be determined using, for example, the controller 110. The status of the mobile apparatus 100 may include at least one of a latest status of the application, a status of a neighboring application or a neighboring widget, a status including at least one of time, position, and information in a user's log, a status of a connection with an external apparatus, a status of a finger input or an electronic pen, and a sensor based status.

For example, the controller 110 can determine the latest status of the application corresponding to the status of the mobile apparatus. In this example, the latest status of the application may include a status indicating when the execution of the application is finished.

For example, when the shortcut icon 210, which corresponds to the Note application, is selected in FIG. 5A, the Note application can be executed as shown in FIG. 255B. Then, as shown in FIG. 5C, in the Note application, a note which has a title of 'Note A' 216 and a content of 'Yongsan-gu, Hannam-dong, Seoul' may be written. When a command completing the execution of the Note application is input, the Note application is terminated. After the Note application is terminated, the home screen may be displayed on the display unit again as shown in FIG. 5D. In this case, since the latest status of the application means the latest status at the completion of the application, in FIGS. 5A to 5D, the latest status of the application may be a status in which the 'Note A' 216 is written. Accordingly, the controller 110 can recognize the status of the written 'Note A' 216 as the latest status of the controller 110. The controller 110, therefore, recognizes the status of the written 'Note A' 216 as the status of the mobile apparatus 100.

In step 1130, an initial entry point of the shortcut icon is changed, by the controller 110, into the changed entry point to correspond to the status. The entry point may be an action of the application executed as the shortcut icon is selected. The initial entry point may be an action of performing the initial status of the application which is executed when the shortcut icon is selected.

For example, when the shortcut icon 210, corresponding to the Note application, is selected in FIG. 5A, the Note application is executed in FIG. 5B. At this time, the initial entry point is an action for executing the initial status of the Note application, which is executed when the shortcut icon 210 is selected. That is, a first action of performing the initial status of the Note application is executed as shown in FIG. 5B, so that the initial screen of the Note application is displayed on the display unit.

At this time, the controller 110 can change the initial entry point of the shortcut icon to the changed entry point, which corresponds to the current status. For example, the status of the mobile apparatus may be the latest status of the application. The latest status of the application means the status at the completion of the application. Therefore, the changed entry point corresponds to an action of executing the latest status at the completion of the application. For example, in FIGS. 5A to 5D, the latest status of the Note application is a status in which the 'Note A' 216 is written. Accordingly, the controller 110 can change the initial entry point (i.e., the Note application) of the shortcut icon to the changed entry point (i.e., Note A), corresponding to the status in which the 'Note A' 216 is written. For example, the controller 110 can change the initial entry point to the changed entry point corresponding to an action of writing the 'Note A' 216.

In step 1140, a gesture for executing the shortcut icon is detected by the controller 110 or the touch screen controller 195.

For example, the execution gesture may be touching the shortcut icon on the touch screen 190. For example, as shown in FIG. 5D, the controller 110 detects the touch of the shortcut icon 210 on the touch screen 190, which corresponds to the execution gesture.

In step 1150, when the execution gesture is detected, the function is executed, by, for example, the controller 110, by the changed entry point. As in the example above, the function may be an application, which is executed, by the controller 110, by the changed entry point when the execution gesture is detected.

Referring to FIG. 5D, when the touch of the shortcut icon is detected, the controller 110 can execute the Note application by the changed entry point. In this example, the changed entry point may be an action of executing the status in which the 'Note A' 216 is executed as shown in FIG. 5D. For example, the controller 110 may execute the Note application by the action of executing the status in which the 'Note A' 216 is written, as shown in FIG. 5C. That is, the controller 110 executes the Note application by executing the status in which the 'Note A' 216 is written, when the shortcut icon 210 is executed in FIG. 5D.

Therefore, the controller 110 executes the application, not by the initial entry point, but by the changed entry point, when the shortcut icon is executed. That is, when the shortcut icon is executed, the controller 110 does not display the initial screen of the Note application as shown in FIG. 5B, but instead displays the Note application in which the 'Note A' 216 is written, as shown in FIG. 5C. Accordingly, a user executes the shortcut icon so as to directly enter the status in which the 'Note A' 216 is written, which is the latest status of the Note application. Further, the user need not execute the 'Note A' in the initial screen of the Note application because the Note application, when selected, directly enters the status in which the 'Note A' 216 is written.

According to the embodiment of the present invention, therefore, there is an advantage in that the function can be executed by the changed entry point to correspond to the status of the mobile apparatus. That is, according to the embodiment of the present invention, there is an advantage in that the application can be immediately executed by the changed entry point corresponding to the latest status of the application, which corresponds to the status of the mobile apparatus.

Figure 6:
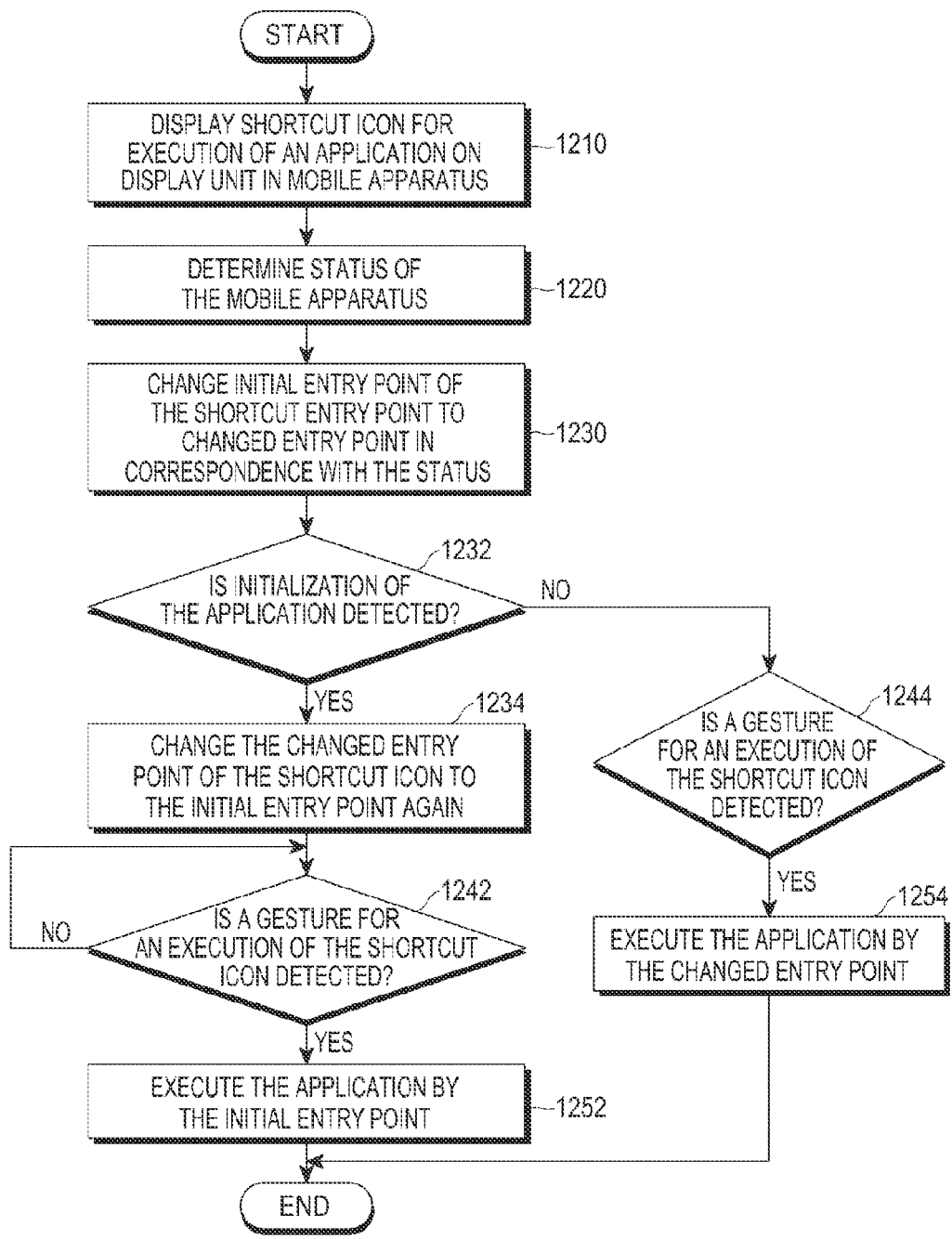
FIG. 6 is a flowchart illustrating a method of controlling a mobile apparatus to provide a changed shortcut icon corresponding to a status of the mobile apparatus according to another embodiment of the present invention.

FIG. 6 is a flowchart illustrating a method of controlling a mobile apparatus to provide a changed shortcut icon corresponding to a status of the mobile apparatus according to another embodiment of the present invention.

Referring to FIG. 6, in step 1210, a shortcut icon corresponding to the application in the mobile apparatus can be displayed in a display unit. The controller of the mobile apparatus 100 displays the shortcut icon, which is used to execute the application, on the display unit. Referring to FIG. 5A, the controller 110 can display the shortcut icon 210, which is used to execute the Note application, on the touch screen 190. At this time, the controller 110 can display the shortcut icon 210, which is used to execute the Note application, in the home screen on the touch screen 190.

In step 1220, the status of the mobile apparatus is determined by, for example, the controller 110. At this time, the status of the mobile apparatus may be at least one of the latest status of the application, a status of a neighboring application or a neighboring widget, a status including at least one of time, a position and information on a user's log, a status of a connection with an external apparatus, a status of a finger input or an electronic pen input, and a sensor based status.

For example, the controller 110 determines the latest state of the application corresponding to the status of the mobile apparatus. At this time, the latest status of the application refers to the latest status at a time when the application is terminated.

For example, when the shortcut icon 210, used for executing the Note application, is selected in FIG. 5A, the Note application can be executed as shown in FIG. 5B. As shown in FIG. 5C, in the Note application, a note which has a title of 'Note A' 216, and a content of 'Yongsan-gu, Hannam-dong, Seoul' is written. When a command indicating the completion of the Note application is input, the Note application can be terminated. When the Note application is terminated, the home screen is displayed again on the display unit, as shown in FIG. 5D. Here, since the latest status of the application may refer to the latest status when the application was terminated, the latest status of the application may be the status in which the 'Note A' 216 was written, in FIGS. 5A to 5D. At this time, the controller 110 can determine the written status of the 'Note A' 216 as the latest status of the application, and, for example, the controller 110 can recognize the written status of the 'Note A' 216 as the status of the mobile apparatus.

In step 1230, the initial entry point of the shortcut icon is changed, by, for example, the controller 110 to the changed entry point to correspond to the current status.

The entry point may be an action of the application which is executed when the shortcut icon is selected. The initial entry point may be an action for executing the application which stays in the initial status and is executed when the shortcut icon is selected.

For example, in FIG. 5A, when the shortcut icon 210 is selected, the Note application can be executed as shown in FIG. 5B. At this point, the initial entry point may be an action for executing the Note application in its the initial status and is executed when the shortcut icon 210 is selected. That is, as shown in FIG. 5B, when the action for executing the Note application in the initial state is performed, the initial screen of the Note application can be displayed on the display unit.

At this time, the controller 110 can change the initial entry point to the changed entry point of the shortcut icon to correspond to the current status. For example, the status of the mobile apparatus may correspond to the latest status of the application. The latest status of the application refers to the latest status at a time when the application is terminated. Therefore, the changed entry point may be an action for executing the application which stays in the latest status after the application is terminated. For example, the latest status of the application may be the status in which the 'Note A' 216 has been written, as shown in FIGS. 5C to 5D. Accordingly, the controller 110 can change the initial entry point (i.e., Note application) to the changed entry point (i.e., Note A), corresponding to the status in which the 'Note A' 216 is written. For example the controller 110 can change the initial entry point to the changed entry point which corresponds to the action for executing the status in which the 'Note A' 216 is written.

In step 1232, the initialization of the application is detected. The controller 110 can detect the initialization of the application. The initialization of the application refers to the initial status of the application. In other words, the initialization of the application refers to the status in which the application was initially executed.

The initialization of the application may be achieved even when the application does not remain in the initial status in which the application is initially executed. That is, the initialization of the application may be achieved when a predetermined condition is satisfied. For example, the predetermined condition may be that the application is not executed for a predetermined time period. The predetermined condition may, alternatively, be that the application is not executed even in a background after the application is terminated.

Therefore, the controller 110 detects that the predetermined condition is satisfied to achieve the initialization of the application. For example, the controller 110 detects that the application has not been executed for the predetermined time period, or that the application is not executed even in the background after the execution of the application has been terminated, which satisfies the predetermined condition. As a result, the controller 110 can detect the initialization of the application.

When the initialization of the application is detected, the controller 110 changes the changed entry point of the shortcut icon back to the initial entry point in step 1234.

Otherwise, if the initialization of the application is not detected, the controller 110 does not change the changed entry point of the shortcut icon to the initial entry point. The initial entry point may be an action for executing the application, which remains in its initial status and can be executed when the shortcut icon is selected. Accordingly, For example when the initialization of the application is detected, the controller 110 can change the changed entry point of the shortcut icon to the initial entry point which corresponds to the action for executing the application staying in the initial status as the shortcut icon is selected, again.

For example, as shown in FIG. 5D, the changed entry point corresponds to an action indicating that the application remains in the latest status after the execution of the application is terminated. The latest status of the application is a status in which the 'Note A' 216 is written. When initialization of the application is detected, the controller 110 changes the changed entry point (indicating the status in which the 'Note A' 216 is written in FIG. 5D) back to the initial entry point (corresponding to the action for executing the application which remains in the initial status in FIG. 5A).

In step 1242, a gesture for executing the shortcut icon (in its initial status) is detected by, for example, the controller 110.

For example, the execution gesture may be a touch of the shortcut icon on the touch screen 190. Accordingly, the controller 110 can detect the touch for the shortcut icon on the touch screen 190. For example, as shown in FIG. 5D, the controller 190 detects the touch of the shortcut icon 210 on the touch screen 190, which corresponds to the execution gesture.

When the execution gesture is detected, the application is executed, by the controller 110, using the initial entry point in step 1252. For example, when the touch for the shortcut icon is detected in FIG. 5D, the controller 110 can execute the Note application using the initial entry point. The initial entry point may be an action for executing the application which remains in its initial status and is executed when the shortcut icon is selected. Therefore, when the touch for the shortcut icon is detected in FIG. 5D, the controller 110 executes the Note application which remains in its initial status, which corresponds to the initial entry point, as shown in FIG. 5A.

Alternatively, when the initialization of the application is not detected, the controller 110 does not change the changed entry icon of the shortcut icon back to the initial entry point. Instead, the controller 110 detects the gesture for executing the shortcut icon in step 1244.

For example, the execution gesture may be a touch of the shortcut icon on the touch screen 190. Therefore, the controller 110 can detect the touch for the shortcut icon on the touch screen 190, which corresponds to the execution gesture. For example, as shown in FIG. 5D, the controller 110 can detect a touch for the shortcut icon 210 on the touch screen 190, which corresponds to the execution gesture.

When the execution gesture is detected, the application is executed, by the controller 110, using the changed entry point in step 1254.

For example, as shown in FIG. 5D, when the touch for the shortcut icon is detected, the controller 110 can execute the Note application using the changed entry point. In this case, the changed entry point may be an action indicating the status in which the 'Note A' 216 is written, as shown in FIG. 5D. Accordingly, the controller 110 can execute the Note application by the action indicating the status in which the 'Note A' 216 is written, as shown in FIG. 5C. That is, when the shortcut icon is selected in FIG. 5D, the controller 110 can immediately execute the Note application by the action indicating the status in which the 'Note A' 216 is written.

According to another embodiment of the present invention, therefore, there is an advantage in that the application is executed using the changed entry point, which corresponds to the status of the mobile apparatus, and the changed entry point is changed back to the initial entry point so that the application is executed, when the initialization of the application is detected. That is, according to another embodiment of the present invention, the application can be immediately executed by the changed entry point, which corresponds to the latest status of the application corresponding to the status of the mobile apparatus. In addition, when the initialization of the application is detected, the application can be executed by changing the changed entry point back to the initial entry point.

Figure 7:
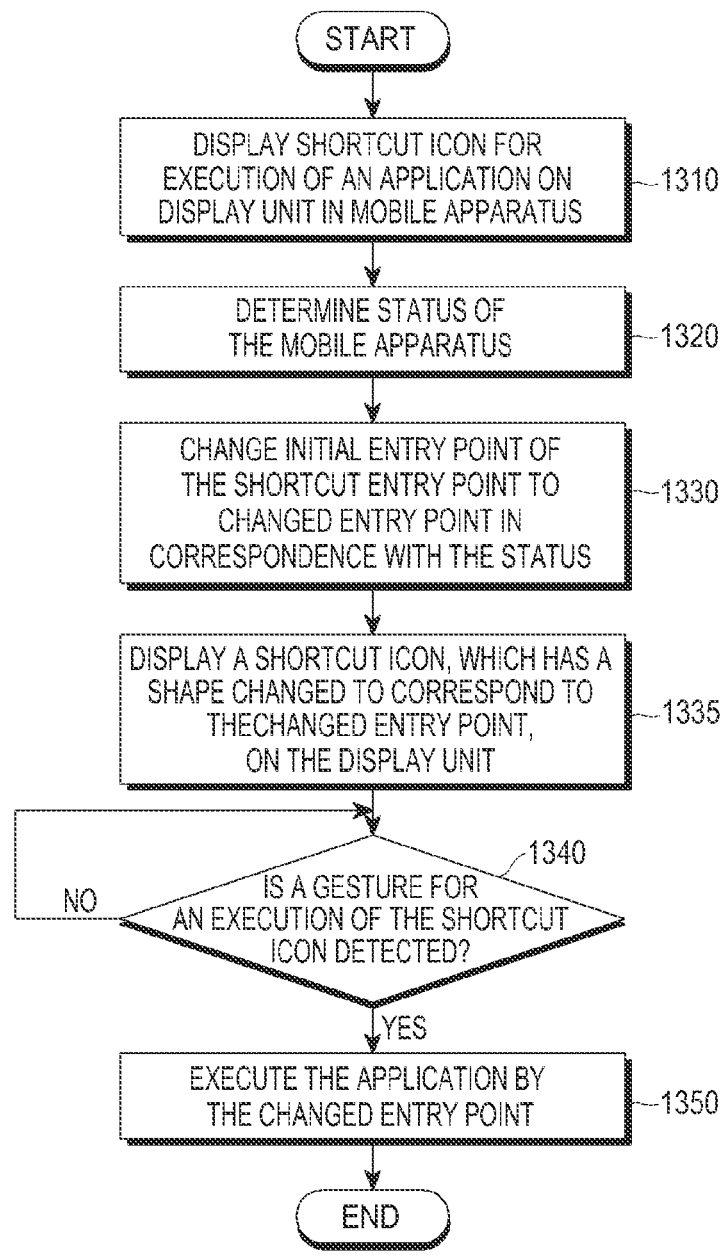
FIG. 7 is a flowchart illustrating a method of controlling a mobile apparatus to provide a changed shortcut icon corresponding to a status of the mobile apparatus according to still another embodiment of the present invention.

FIG. 7 is a flowchart illustrating a method of controlling a mobile apparatus to provide a changed shortcut icon corresponding to a current status of the mobile apparatus according to another embodiment of the present invention.

Referring to FIG. 7, in step 1310, the shortcut icon corresponding to the application is displayed on the display unit of the mobile apparatus. For example The controller 110 of the mobile apparatus 100 can display the shortcut icon, which is used for executing the application, on the display unit.

Referring to FIG. 5A, the controller 110 can display the shortcut icon 210 for the execution of the Note application on the touch screen 190 (e.g., in the home screen on the touch screen 190). The shortcut icon 210 includes an image 212 and a text 214. For example, as shown in FIG. 5A, the controller 110 can display the shortcut icon 210 including the Note image 212, and the text 214 such as, for example, 'S-note', in the home screen on the touch screen 190.

In step 1320, the status of the mobile apparatus is determined by the controller 110. The status of the mobile apparatus may include at least one of a status including at least one of the latest status of the application, a status of a neighboring application or a neighboring widget, time, a position and information on a user's log, a status of connection with an external apparatus, a status of a finger input or an electronic pen input, and a sensor based status.

For example, the controller 110 determines the latest status of the application corresponding to the status of the mobile apparatus. In this case, the latest status of the application may mean the latest status at a time when the execution of the application is completed.

For example, when the shortcut icon for the execution of the Note application is selected as shown in FIG. 5A, the Note application can be executed as shown in FIG. 5B. In the Note application as shown in FIG. 5C, a note which has a title of 'Note A' 216 and a content of 'Yongsan-gu, Hannam-dong, Seoul', can be written. When a command for the completion of the Note application is input, the Note application can be terminated. After the Note application is terminated, the home screen can be displayed on the display unit again, as shown in FIG. 5D. Here, the latest status of the application may mean the latest status at the termination of the application. Therefore, in FIGS. 5A to 5D, the latest status of the application may be, for example, the status in which the 'Note A' 216 has been written. At this point, the controller 110 can determine the status in which the 'Note A' 216 is written, as the latest status of the application. Accordingly, the controller 110 can recognize the status in which the 'Note A' 216 is written, as the status of the mobile apparatus.

In step 1330, the initial entry point of the shortcut icon is changed, by the controller 110, to the changed entry point, corresponding to the current status.

The entry point may be an action of the application which is executed when the shortcut icon is selected. The initial entry point may be an action for executing the application which remains in the initial status and is executed when the shortcut icon is selected.

For example, when the shortcut icon 210 for the execution of the Note application is selected in FIG. 5A, the Note application can be executed as shown in FIG. 5B. At this time, the initial entry point may be an action for executing the Note application which remains in the initial status as the shortcut icon 210 is selected. That is, when the initial action for the execution of the application which remains in the initial status is executed, as shown in FIG. 5B, the initial status of the Note application can be displayed on the display unit.

At this time, the controller 110 can change the initial entry point of the shortcut icon to the changed entry point, corresponding to the current status. For example, the status of the mobile apparatus may be the latest status of the application. The latest status of the application may refer to the status at a time when the execution of the application is terminated. Therefore, the changed entry point may be an action indicating the latest status when the execution of the application is terminated. In FIGS. 255A to 5D, the latest status of the application may be, for example, the status in which the 'Note A' 216 is written. Accordingly, the controller 110 can change the initial entry point of the shortcut icon to the changed entry point, corresponding to the status in which the 'Note A' 216 is written. That is, the controller 110 can change the initial entry point to the changed entry point which corresponds to the action indicating the status in which the 'Note A' 216 is written.

In step 1335, a shortcut icon which has a shape changed to correspond to the changed entry point, is displayed on the display unit. The controller 110 can display the shortcut icon, which has the changed shape, on the display unit. In this scenario, the changed shortcut icon may have the same image as the initial shortcut icon, and a text of the shortcut icon can be changed to reflect the changed entry point.

For example, as shown in FIG. 5A, the shortcut icon 210 may include the Note image 212 and the text 214 (e.g., 'S-note'). The controller 110 displays the shortcut icon 210 with the identical Note image 212, as shown in FIG. 5D. However, the controller 110 changes the initial text 214 of the shortcut icon to the new text 216 reflecting the changed entry point. For example, the changed entry point may be an action indicating the latest status when the execution of the application is terminated. In FIGS. 5A to 5D, the latest status of the application may be the status in which the 'Note A' 216 is written. Accordingly, the controller 110 can change the text of the shortcut icon to the 'Note A' 216 by reflecting the change entry point. Therefore, a user recognizes the new text reflecting the changed entry point, and can immediately recognize that the Note application is executed as the 'Note A' when the shortcut icon 210 is executed.

In step 1340, a gesture for the execution of the shortcut icon is detected. The controller 110 can detect the execution gesture for the execution of the shortcut icon.

For example, the execution gesture may be a touch for the shortcut icon on the touch screen 190. Accordingly, the controller 110 can detect the touch of the shortcut icon on the touch screen 190, which corresponds to the execution gesture.

In step 1350, when the execution gesture is detected, the application is executed using the changed entry point. The controller 110 can execute the application using the changed entry point when the execution gesture is detected.

For example, when a touch of the shortcut icon is detected in FIG. 5D, the controller 110 can execute the Note application using the changed entry point. The changed entry point may be an action indicating the status in which the 'Note A' is written, as shown in FIG. 5D. Therefore, the controller 110 can execute the Note application by the action indicating the status in which the 'Note A' 216 is written, as shown in FIG. 5C. That is, the controller 110 can execute the Note application by an action indicating the status in which the 'Note A' 216 is written, when the shortcut icon is executed in FIG. 5D.

According to another embodiment of the present invention, therefore, there is an advantage in that the shortcut icon which has a shape changed to correspond to the changed entry point according to the status of the mobile apparatus can be displayed on the display unit. That is, the user can easily recognize the shortcut icon which has the changed shape corresponding to the changed entry point. According to another embodiment of the present invention, there is an advantage in that the user can know by which changed entry point the application is executed by recognizing that the changed shape of the shortcut icon.

Figure 8:
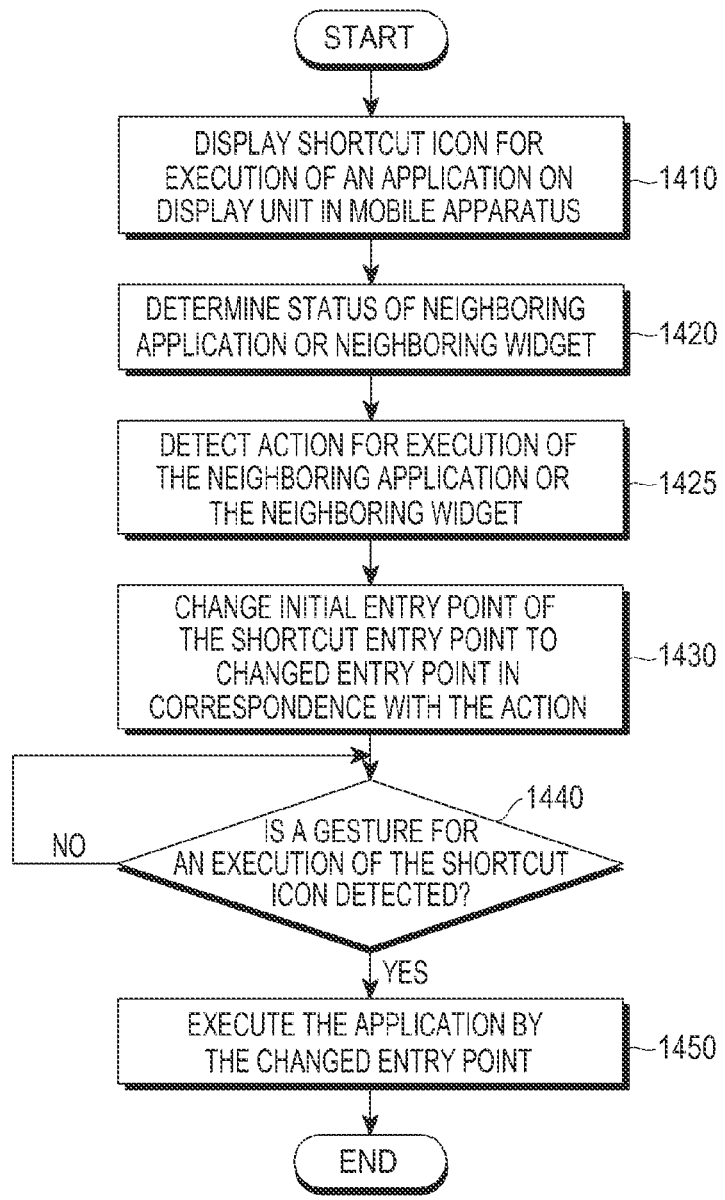
FIG. 8 is a flowchart illustrating a method of controlling a mobile apparatus to provide a changed shortcut icon corresponding to a status of the mobile apparatus according to another embodiment of the present invention.
Figure 9:
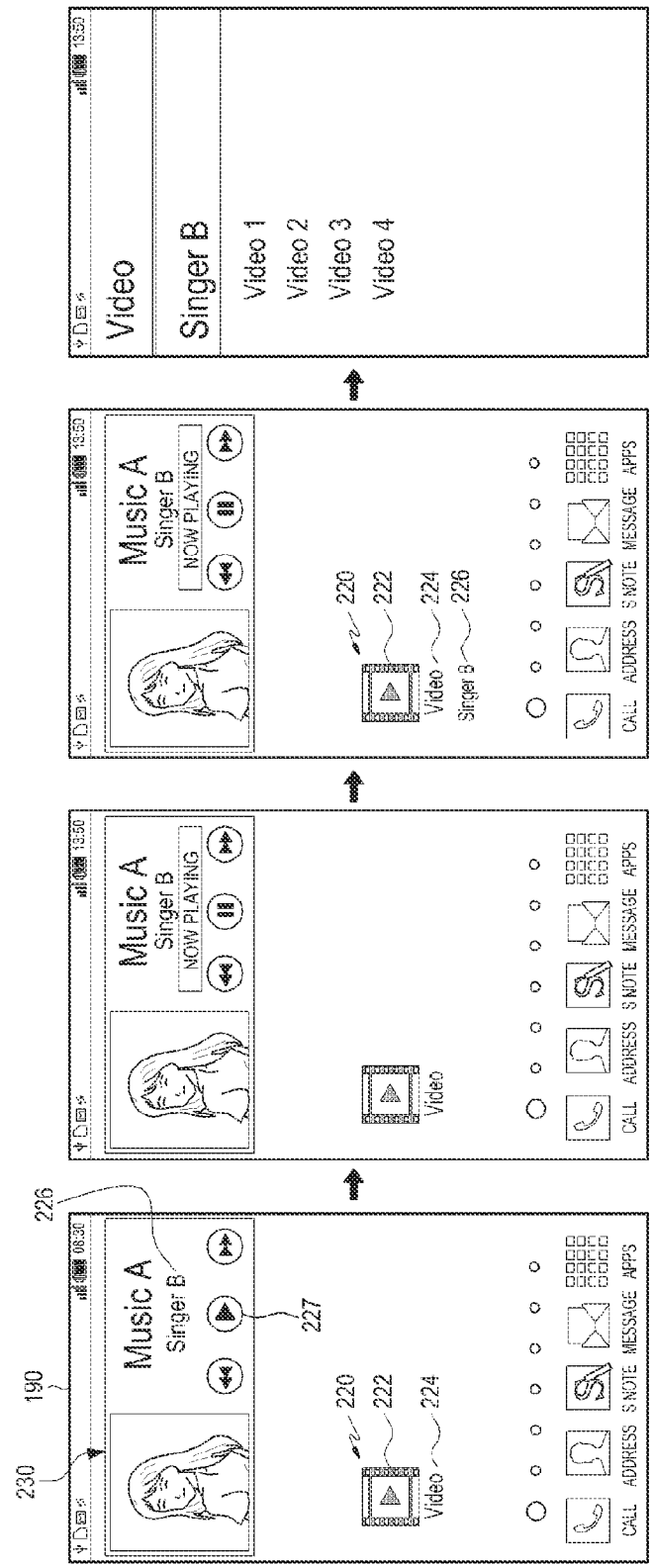
FIGS. 9A, 9B, 9C, 9D, 10A, 10B, 10C and 10D are views showing screens in which the method of controlling the mobile apparatus providing the changed shortcut icon corresponding to the status of the mobile apparatus is executed according to another embodiment of the present invention.
Figure 10:
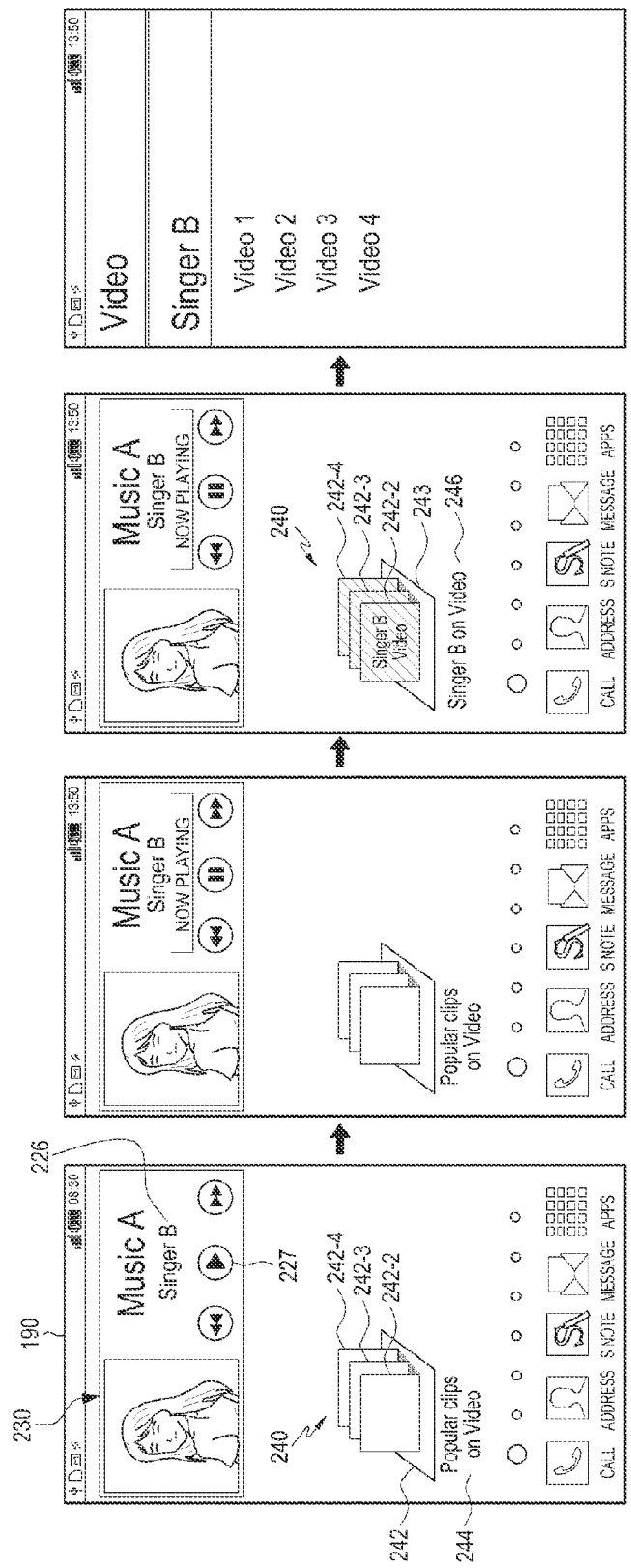

FIG. 8 is a flowchart illustrating a method of controlling a mobile apparatus to provide a changed shortcut icon corresponding to a status of the mobile apparatus according to another embodiment of the present invention. FIGS. 9A and 10D are views showing screens in which the method of controlling the mobile apparatus to the changed shortcut icon corresponding to the status of the mobile apparatus is executed according to another embodiment of the present invention.

Referring to FIG. 8, in step 1410, the shortcut icon for the execution of the application in the mobile apparatus is displayed on the display unit. The controller 110 of the mobile apparatus 100 can display the shortcut icon for the execution of the application on the display unit. Referring to FIG. 9A, the controller 110 can display a shortcut icon 220 for an execution of a video application on the touch screen 190 (e.g., on the home screen). The shortcut icon 220 includes an image 222 and a text 224. For example, the controller 110 can display a video image 222 including a text 224 such as 'Video' in the home screen on the touch screen 190, as shown in FIG. 9A.

Referring to FIG. 10A, the controller 110 can display the shortcut icon 220 for the execution of the video application on the touch screen 190. The shortcut icon 220 can be displayed in a form of a pile of video contents which are stacked. In this case, the shortcut icon 220 includes an image, in which the video contents are stacked in a pile, and a text. As shown in FIG. 10A, for example, the controller 110 can display the shortcut icon 240 including an image 242, in which video contents 242-2, 242-3 and 242-4 are stacked in a pile, and a text 244 such as 'Popular clips on Video' in the home screen of the touch screen 190.

In step 1420, the status of the mobile apparatus is determined by the controller 110. At this time, the status of the mobile apparatus may include at least one of a status including at least one of the latest status of the application, a status of a neighboring application or a neighboring widget, time, a position and information on a user's log, a status of a connection with an external apparatus, a status of a finger input or an electronic pen input, and a sensor based status.

For example, the controller 110 can recognize the status of a neighboring application or a neighboring widget, which corresponds to the status of the mobile apparatus. In this case, the status of the neighboring application or the neighboring widget may refer to an execution status of the neighboring application or the neighboring widget. The execution status of the neighboring application or the neighboring widget may be a reproduction status.

Referring to FIG. 9A, the controller 110 can display the neighboring widget 226 on the touch screen 190. For example, the neighboring widget may be a music widget 226. In FIG. 9A, when a selection for the reproduction icon 227 is detected, the music widget 226 can reproduce music in FIG. 9B. The controller 110 can detect a reproduction status corresponding to the execution status of the neighboring widget 226. Furthermore, as shown in FIGS. 10A and 10B, the controller 110 can detect the reproduction status corresponding to the execution status of the neighboring widget 226.

In step 1425, an action executed in the neighboring application or the neighboring widget is detected by the controller 110. For example, the action executed in the neighboring application or the neighboring widget may be a reproduction of the contents.

Referring to FIG. 9B, an action executed in a music widget 226 corresponding to the neighboring widget may be a reproduction of a song by a singer B. Accordingly, the controller 110 can detect the reproduction of the song by the singer B as the action executed in the neighboring widget. As shown in FIGS. 10A and 10B, in which another embodiment is shown, the controller 110 can detect the reproduction of the song by the singer B as the action executed in the neighboring widget.

In step 1430, the initial entry point of the shortcut icon 220, 240 is changed, by the controller 110, to the changed entry point to correspond to the action.

The entry point may be an action of the application which is executed, when the shortcut icon is selected. The initial entry point may be an action for an execution of the application which remains in an initial status and is executed, when the shortcut icon is selected. For example, the initial entry point may be an action for an execution of the video application which remains in an initial status and is executed when the shortcut icon 220 and 240 are selected.

At this time, the controller 110 changes the initial entry point of the shortcut icon to the changed entry point, which corresponds to the action. For example, the changed entry point may be an action executed in the neighboring application or the neighboring widget. As shown in FIG. 9C or 10C, for example, the changed entry point may be a reproduction of a video of a singer B, which corresponds to an action executed in the neighboring application or the neighboring widget. Accordingly, the controller 110 can change the initial entry point of the shortcut icon to the changed entry point which corresponds to a reproduction of the video of the singer B corresponding to the action executed in the neighboring application or the neighboring widget.

The controller 110 can display a shortcut icon having a shape changed to correspond to the changed entry point on the display unit.

As shown in FIG. 9A, the shortcut icon 220 may include a video image 222 and a text 224 such as 'Video'. As shown in FIG. 9C, the controller 110 keeps the original video image 222 of the shortcut icon 220 identical to that shown in FIG. 9C. However, the controller 110 changes the text 226 of the shortcut icon to reflect the changed entry point. For example, the changed entry point may be an action executed in the neighboring application or the neighboring widget. In FIGS. 9A to 9C, the action executed in the neighboring application or the neighboring widget may be a reproduction of a video of the singer B. Therefore, the controller 110 can change the text of the shortcut icon to a 'Video' 224 and a 'Singer B' 226 to reflect the changed entry point. Accordingly, the user recognizes the text to which the changed entry point has been changed. As a result, the user can immediately recognize which changed entry point the application is executed by, when the shortcut icon is executed. That is, the user recognizes the text of the shortcut icon such as 'Video' 224 and 'Singer B' 226, as shown in FIG. 9C. Then, the user can immediately recognize that the video application for the 'Singer B' is executed when the shortcut icon 220 is selected.

As shown in FIG. 10A, in which another embodiment is shown, the shortcut icon 240 may include an image 242 in which video contents 242-2, 242-3 and 242-4 are stacked in a form of a pile, and a text 244 such as 'Popular clips on Video'. At this time, the controller 110 can change the video image 222 and the text 226 of the shortcut icon to reflect the changed entry point. For example, the changed entry point may be an action executed in the neighboring application or the neighboring widget. In FIGS. 10A to 10C, the action executed in the neighboring application or the neighboring widget may be a reproduction of the video of the singer B. Accordingly, the controller 110 can change the original video image 242 to a new video image 243 of the shortcut icon 220 to reflect the changed entry point and inserting a text such as a 'Singer B on Video' in the new video image 243. The controller 110 also changes the text 244 of the shortcut icon to a 'Singer B on Video' 246 to reflect the changed entry point. Therefore, the user recognizes the text to which the changed entry point is reflected. As a result, the user can immediately recognize which changed entry point the application is executed by, when the shortcut icon is selected. That is, since the user recognizes the video image 243 in which the text such as the 'Singer B on Video' is inserted, and the text of the shortcut icon which is changed to the 'Singer B on Video' 246, it is possible to immediately recognize that the video application corresponding to the 'Singer B' is executed, when the shortcut icon 240 is selected.

In step 1440, a gesture for executing the shortcut icon is detected by the controller 110.

For example, the execution gesture may be a touch to the shortcut icon on the touch screen 190. Accordingly, the controller 110 can detect the touch to the shortcut icon on the touch screen 190, which corresponds to the execution gesture. As shown in FIGS. 9C and 10C, the controller 110 can detect the touch to the shortcut icon 220 and 240 on the touch screen 190, which corresponds to the execution gesture.

In step 1450, when the execution gesture is detected, the application is executed, by the controller 110, using the changed entry point.

For example, in FIGS. 9C and 10C, when the touch to the shortcut icon is detected, the controller 110 can execute the video application using the changed entry point. The changed entry point may be an action for the execution of the video application of the 'Singer B', as shown in FIG. 9D or 10D. Therefore, the controller 110 can execute the video application of the 'Singer B', as shown in FIG. 9D or 10D. That is, the controller 110 can immediately execute the video application of the 'Singer B', when the shortcut icon is executed, as in FIGS. 9C and 10C.

According to another embodiment of the present invention, there is an advantage in that the application can be executed by the changed entry point according to the status of the mobile application. According to an embodiment of the present invention, there is an advantage in that the application can be immediately executed using the changed entry point corresponding to the status of the neighboring application or the neighboring widget which corresponds to the status of the mobile apparatus.

Figure 11:
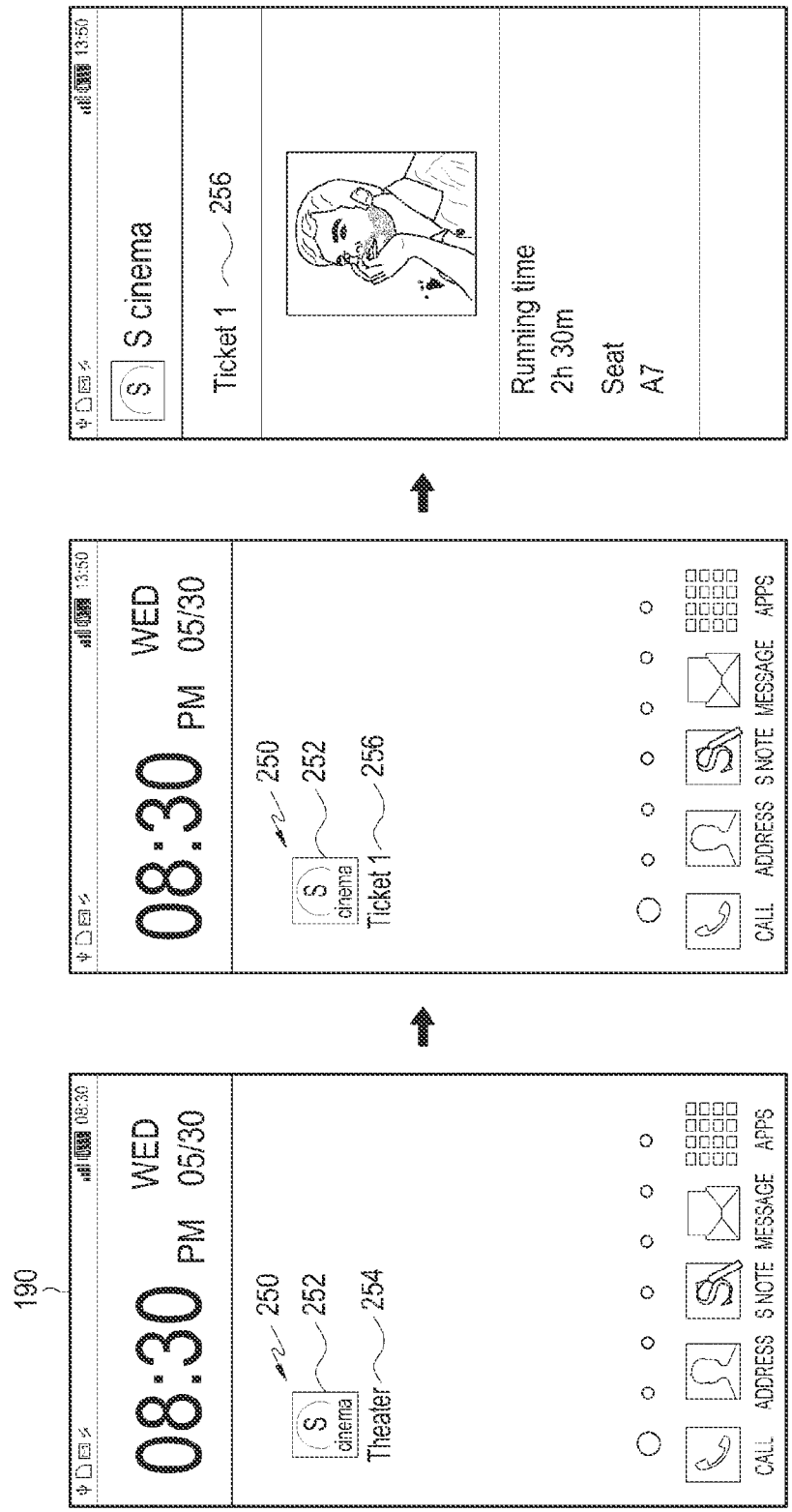
FIGS. 11A, 11B and 11C are views showing screens in which the method of controlling to the status of the mobile apparatus providing the changed shortcut icon corresponding to the status of the mobile apparatus is executed according to still another embodiment of the present invention.

FIGS. 11A to 11C are views showing screens in which the method of controlling the mobile apparatus to provide the changed shortcut icon corresponding to the status of the mobile apparatus is executed according to another embodiment of the present invention.

Referring to FIG. 7 again, in the method of controlling the mobile apparatus which provides the changed shortcut icon corresponding to the status of the mobile apparatus, firstly, the shortcut icon for the execution of the application is displayed on the display unit in the mobile application, in step 1310. The controller 110 of the mobile application 100 can display the shortcut icon for the execution of the application on the display unit. Referring to FIG. 11A, the controller 110 can display a shortcut icon 250 for an execution of an application which is used to buy a ticket for watching a movie, on the touch screen 190. At this time, the controller 110 can display the shortcut icon 250 for the execution of the application for a ticketing of a movie, in the home screen on the touch screen 190. The shortcut icon 250 may include an image 252 and a text 254. As shown in FIG. 11A, the controller 110 can display the shortcut icon 250, which includes an image 252 of a movie and a text 254 such as 'Theater', in the home screen on the touch screen 190.

In step 1320, the status of the mobile apparatus is determined by the controller 110. The status of the mobile apparatus includes at least one of a status including at least one of the latest status of the application, a status of a neighboring application or a neighboring widget, time, a position and information on a user's log, a status of connection with an external apparatus, a status of a finger input or an electronic pen input, and a sensor based status.

For example, the controller 110 can recognize the status including at least one of time, a position and information on a user's log, which relate to the status of the mobile apparatus. The time and position refer to a present time and a present position of the mobile apparatus 100. For example, the mobile apparatus 100 shows the present time (i.e., 08:30 PM, Wednesday, May 30), and the present position (i.e. 'Gangnam').

Therefore, the controller 110 can recognize the present time and the present position of the mobile apparatus 100, as the status including at least one of time, the position and the user's log, which correspond to the status of the mobile apparatus.

In step 1330, the initial entry point of the shortcut icon is changed, by the controller 110, to the changed entry point according to the determined status.

The entry point may be an action of the application which is executed as the shortcut icon is selected. The initial entry point may be an action for the execution of the application which remains in the initial status, when the shortcut icon is selected. For example, the initial entry point may be an action for the execution of the application for ticketing of a movie, which remains in the initial status, when the shortcut icon 250 is selected.

The controller 110 can change the initial entry point of the shortcut icon to the changed entry point according to the status. For example, the status of the mobile apparatus may include at least one of time, a position and information on a user's log. Accordingly, the changed entry point may be an action relating to the status including at least one of time, a position and information on the user's log. For example, the changed entry point may be an action indicating a movie ticket relating to the present time, (i.e., 08:30 PM, Wednesday, May 30), and the present position (i.e., 'Gangnam') of the mobile apparatus. Therefore, the initial entry point of the shortcut icon can be changed to the changed entry point.

In step 1335, the shortcut icon, which has a shape changed to correspond to the changed entry point, can be displayed, by the controller 110, on the display unit. The changed shortcut icon has an identical image to the original shortcut icon. A text of the shortcut icon can be changed to reflect the changed entry point.

The shortcut icon 250 includes a movie image 252 and a text 254 such as 'Theater'. The controller 110 can keep the movie image 252 of the shortcut icon 250 as shown in FIG. 11B and change the text 256 of the shortcut icon to reflect the changed entry point. For example, the changed entry point may be action relating to the status which includes at least one of time, a position and information on a user's log. In FIG. 11B, the action relating to the status which includes at least one of time, the position and the information on the user's log may indicate the ticket of the movie with relation to the present time (i.e., 08:30 PM, Wednesday, May 30), and the present position (i.e., 'Gangnam'). Therefore, the controller 110 can change the text 256 of the shortcut icon to a 'Ticket 1' 256 of the movie ticket relating to the present time and the present position, to reflect the changed entry point. Accordingly, since the user recognizes the text to which the changed entry point is reflected, it is possible to immediately recognize which changed entry point the application is executed by, when the shortcut icon is selected. That is, the user recognizes the text 256 of the shortcut icon such as 'Ticket 1' 256 shown in FIG. 11B. As a result, it is possible to immediately recognize that the application for buying the movie ticket, which indicates the movie ticket with relation to the present time (i.e., 08:30 PM, Wednesday, May 30), and the present position (i.e., 'Gangnam'), is executed, when the shortcut icon 250 is selected.

In step 1340, a gesture for an execution of the shortcut icon is detected by the controller 110.

For example, the execution gesture may be a touch to the shortcut icon on the touch screen 190. Accordingly, the controller 110 can detect the touch to the shortcut icon on the touch screen 190, which corresponds to the execution gesture. For example, the controller 110 can detect the touch to the shortcut icon 250 on the touch screen 190, which corresponds to the execution gesture, as shown in FIG. 11B.

In step 1350, when the execution gesture is detected, the application is executed, by the controller 110, using the changed entry point.

For example, when the touch to the shortcut icon is detected in FIG. 11B, the controller 110 can execute the application for buying the movie ticket, using the changed entry point. The changed entry point may be an action indicating the movie ticket with relation to the present time (i.e., 08:30 PM, Wednesday, May 30), and the present position (i.e., 'Gangnam'). Accordingly, the controller 110 can execute the application for buying the movie ticket by the action indicating the movie ticket with relation to the present time, and the present position, as shown in FIG. 11C. That is, the controller 110 can display 'Ticket 1' 256 which is the movie ticket with relation to the present time (i.e., 08:30 PM, Wednesday, May 30), and the present position (i.e., 'Gangnam'), as shown in FIG. 11C.

According to another embodiment of the present invention, there is an advantage in that the application can be executed using the changed entry point according to the status of the mobile apparatus. According to the embodiment of the present invention, there is an advantage in that the application can be immediately executed using the changed entry point which corresponds to the current status including at least one of time, a position and information on a user's log, which correspond to the status of the mobile apparatus.

Figure 12:
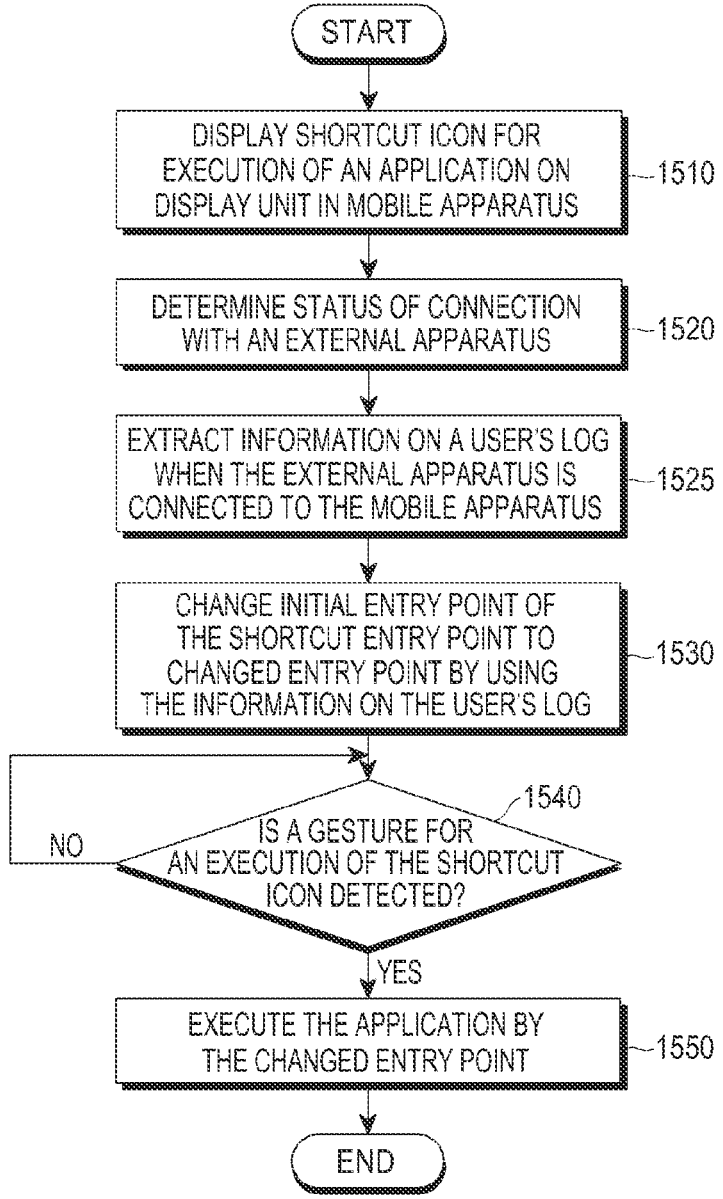
FIG. 12 is a flowchart illustrating a method of controlling the mobile apparatus to provide the changed shortcut icon corresponding to the status of the mobile apparatus according to another embodiment of the present invention.

FIG. 12 is a flowchart illustrating a method of controlling the mobile apparatus to provide the changed shortcut icon corresponding to the status of the mobile apparatus according to another embodiment of the present invention. FIGS. 13A to 13D are views showing screens in which a method of controlling a mobile apparatus to provide a changed shortcut icon corresponding to a status of the mobile apparatus is executed according to another embodiment of the present invention.

Figure 13:
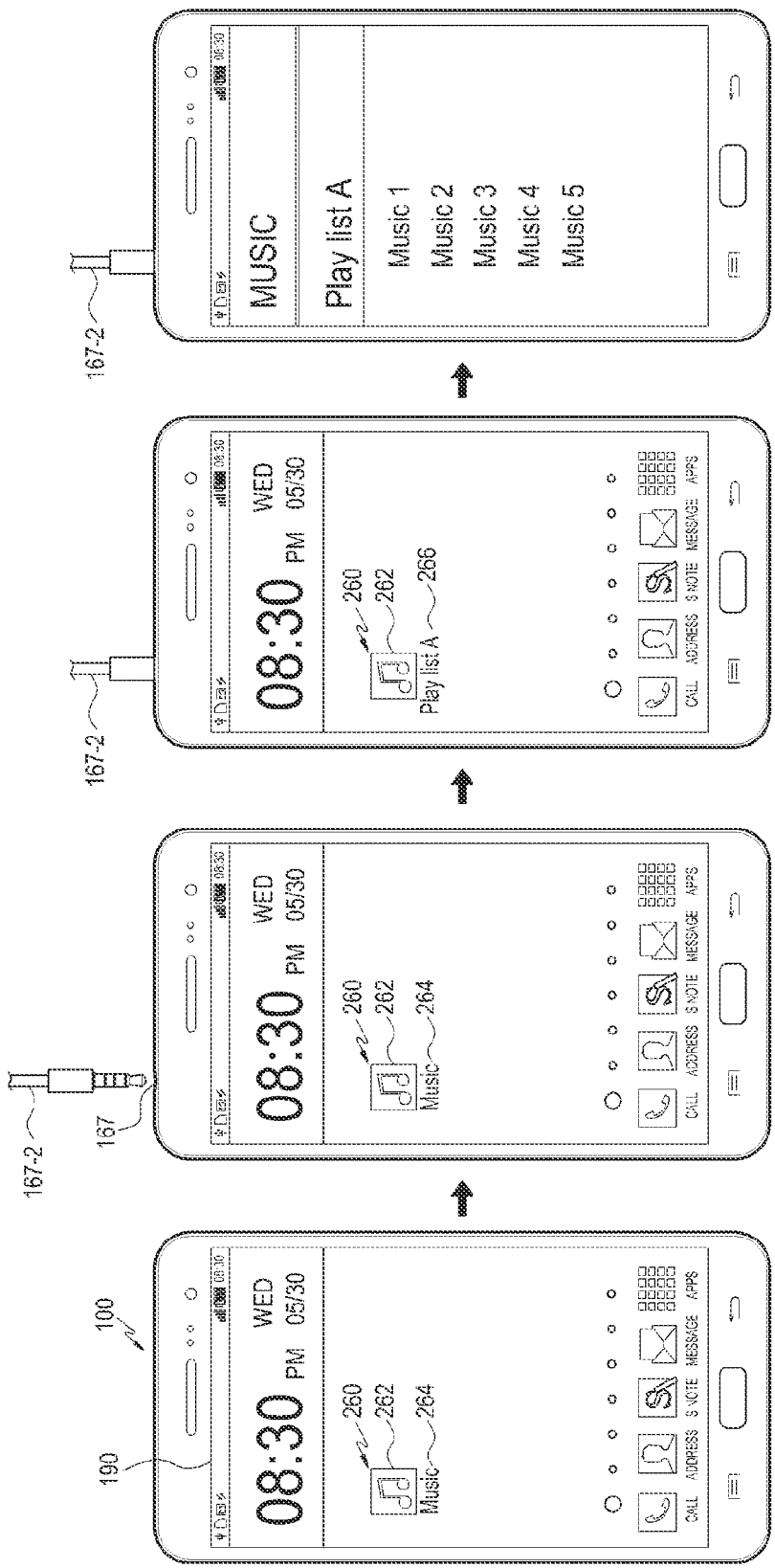
FIGS. 13A, 13B, 13C, and 13D are views showing screens in which a method of controlling a mobile apparatus to provide a changed shortcut icon corresponding to a status of the mobile apparatus is executed according to another embodiment of the present invention.

Referring to FIG. 12, in step 1510, the shortcut icon for the execution of the application is displayed on a display unit in the mobile apparatus. The controller 110 of the mobile apparatus can display the shortcut icon for the execution of the application on the display unit. Referring to FIG. 13A, the controller 110 can display a shortcut icon 260 for an execution of a music application on the display unit formed with the touch screen. At this time, the controller 110 can display the shortcut 260 for the execution of the music application in the home screen on the touch screen 190. The shortcut icon 260 may include an image 262 and a text 264. For example, as shown in FIG. 13A, the controller 110 can display the shortcut icon 260 including a music image 262 and a text 264 such as 'Music' in the home screen on the touch screen 190.

In step 1520, the status of the mobile apparatus is determined by the controller 110. The status of the mobile apparatus includes at least one of a status of a neighboring application or a neighboring widget, a status including at least one of time, a position and information on a user's log, a status of connection with an external apparatus, a status of a finger input or an electronic pen input, and a sensor based status.

For example, the controller 110 can recognize the status of a connection with the external apparatus corresponding to the status of the mobile apparatus. At this time, the external apparatus may be an earphone 167-2 as shown in FIG. 12B. Therefore, the controller 110 can recognize that the earphone 176-2 is connected to the earphone jack 167.

In step 1525, the user log information is extracted by the controller 110 when the external apparatus is connected to the mobile apparatus. For example, the user log information extracted may be information which is frequently used when the external apparatus is connected to the mobile apparatus.

For example, the user log information may be a play list A which is frequently used when the earphone 167-2 is connected to the mobile apparatus 100, as shown in FIG. 13B.

In step 1530, the initial entry point is changed, by the controller 110, to the changed entry point by using the user log information. T The entry point may be an action of the application executed when the shortcut icon is selected. The initial entry point may be an action for the execution of the application which remains in the initial status and is executed when the shortcut icon is selected. For example, the initial entry point may be an action for an execution of the music application which is executed when the shortcut icon 260 is selected.

The controller 110 can change the initial entry point of the shortcut icon to the changed entry point by using the user log information. Accordingly, the changed entry point may be an action relating to the user log information. For example, the changed entry point may be an action for an execution of the play list A which is frequently used and corresponds to the user's log information, when the earphone 167-2 is connected to the mobile apparatus 100. Therefore, the controller 110 can change the initial entry point to the changed entry point by the action for the execution of the play list A which is frequently used when the earphone is connected to the mobile apparatus.

The controller 110 can display the shortcut icon, which has a shape changed to correspond to the changed entry point, on the display unit. At this time, the changed shortcut icon has an identical image to that of the shortcut icon, and a text of the shortcut icon may be changed by reflecting the changed entry point.

The shortcut icon 260 includes a music image 262 and a text 264 such as 'Music'. The controller 110 can keep the original music image 262 of the shortcut icon 260, as shown in FIG. 13C and can change the text 266 of the shortcut icon to reflect the changed entry point. For example, the changed entry point may be an action for the execution of the play list A which is frequently used when the earphone is connected to the mobile apparatus. Accordingly, the controller 110 can change the text 264 of the shortcut icon to the 'Play list A' 266 to reflect the changed entry point. Therefore, since the user recognizes the text to which the changed entry point is reflected, it is possible to immediately recognize which changed entry point the application is executed by, when the shortcut icon is selected. That is, the user recognizes the text 266 of the shortcut icon, such as 'Play list A' 266 in FIG. 13C. As a result, the user can immediately recognize that the music application will execute the 'Play list A' when the short icon 260 is selected.

In step 1540, a gesture for an execution of the shortcut icon is detected by the controller 110.

For example, the execution gesture may be a touch to the shortcut icon on the touch screen 190. Accordingly, the controller 190 can detect the touch to the shortcut icon on the touch screen 190, which corresponds to the execution gesture. As shown in FIG. 13C, the controller can detect the touch to the shortcut icon 260 on the touch screen 190, which corresponds to the execution gesture.

When the execution gesture is detected, the application is executed by the controller 110 using the changed entry point in step 1550.

When the touch to the shortcut icon is detected in FIG. 13C, the controller 110 can execute the music application using the changed entry point. The changed entry point may be an action for an execution of the play list A which is frequently used when the earphone is connected to the mobile apparatus. Accordingly, the controller 110 can execute the music application by the action for the execution of the play list A which is frequently used when the earphone is connected to the mobile apparatus, as shown in FIG. 13D.

According to another embodiment of the present invention, there is an advantage in that the application can be executed by the changed entry point according to the status of the mobile apparatus. According to the embodiment of the present invention, there is an advantage in that the application can be immediately executed by the changed entry point corresponding to the status of the mobile apparatus, according to the status of the connection with the external apparatus.

Figure 14:
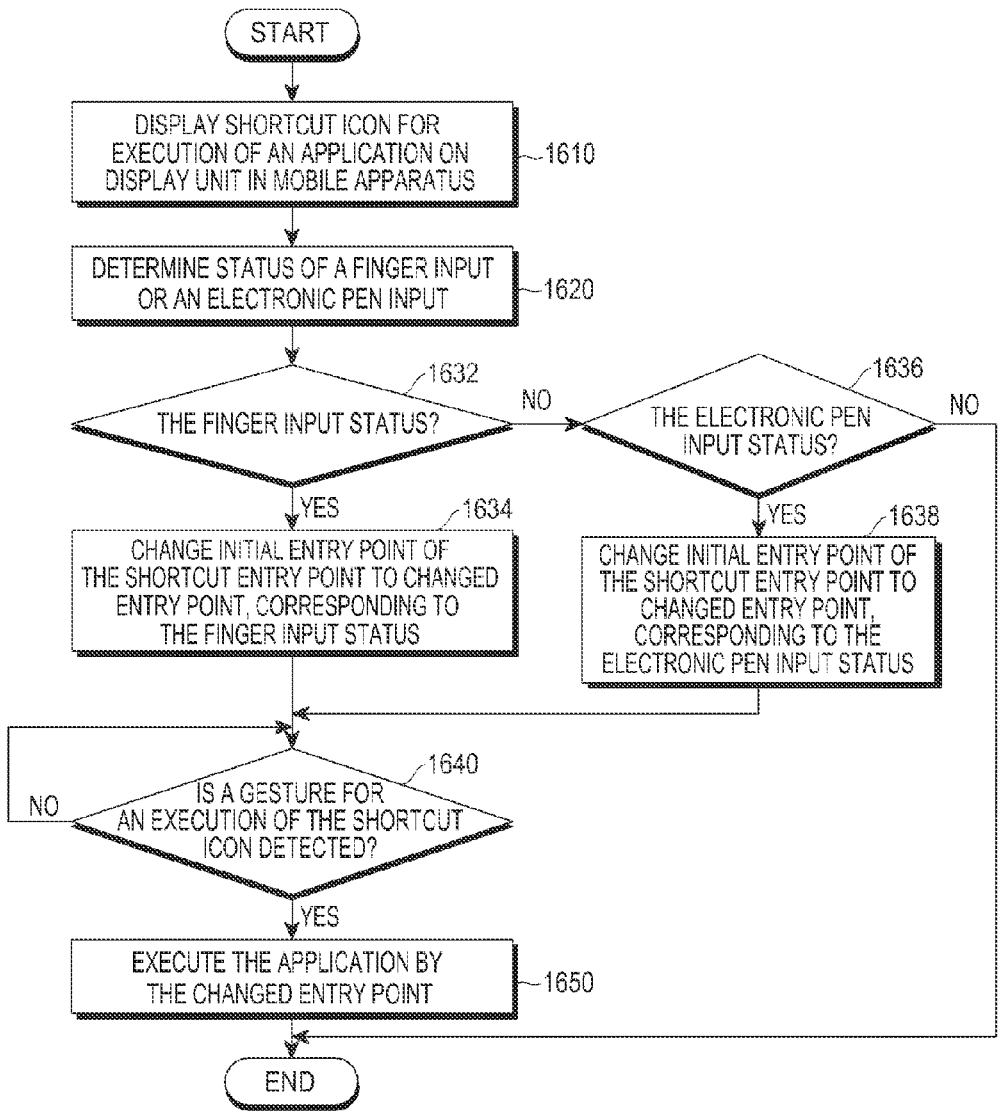
FIG. 14 is a flowchart illustrating a method of controlling the mobile apparatus to provide the changed shortcut icon corresponding to the status of the mobile apparatus according to another embodiment of the present invention.

FIG. 14 is a flowchart illustrating a method of controlling the mobile apparatus to provide the changed shortcut icon corresponding to the status of the mobile apparatus according to another embodiment of the present invention. FIGS. 15A to 16C are views showing screens in which a method of controlling a mobile apparatus to provide a changed shortcut icon corresponding to a status of the mobile apparatus is executed according to another embodiment of the present invention.

Figure 15C:
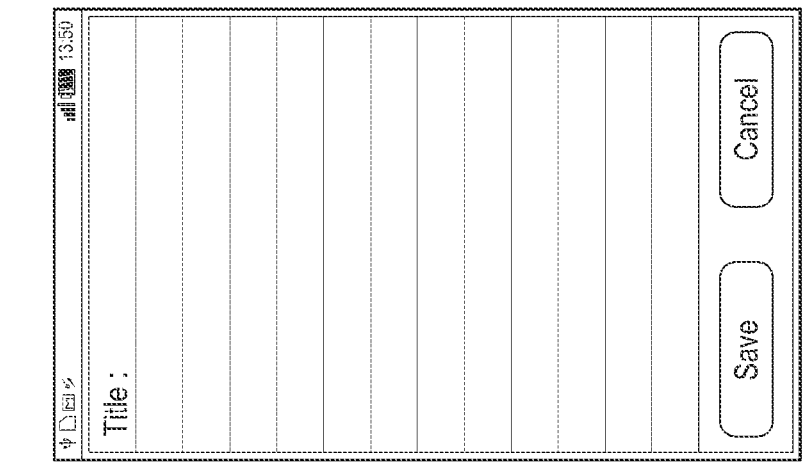
Figure 15B:
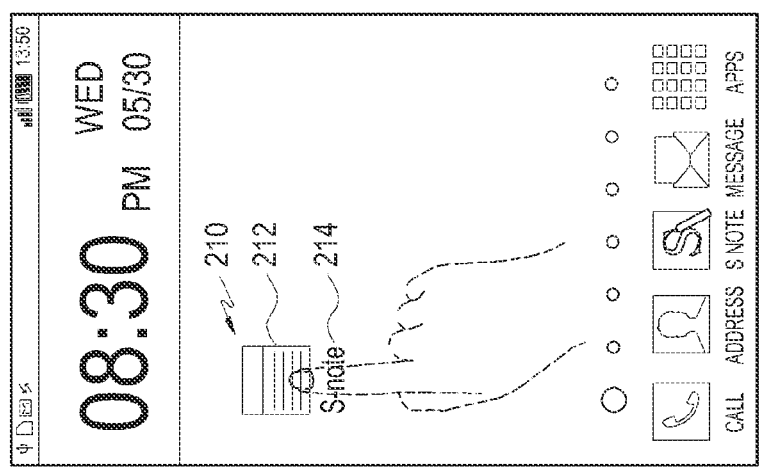
Figure 15A:
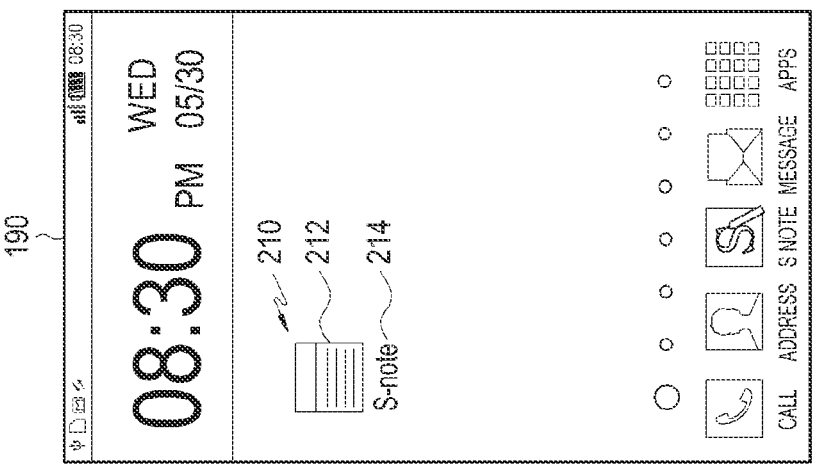

Referring to FIG. 14, in step 1610, the shortcut icon for the execution of the application is displayed, by the controller 110, on the display unit in the mobile apparatus. Referring to FIGS. 15A and 16A, the controller 110 of the mobile apparatus can display a shortcut icon 210 for an execution of a Note application on the display unit formed with the touch screen 190. At this time, the controller 110 can display the shortcut icon 210 for the execution of the Note application in the home screen on the touch screen 190. The shortcut icon 210 may include an image 212 and a text 214. As shown in FIGS. 15A and 16A, the controller 110 can display the shortcut icon 210, which includes a Note image 212, and a text 214, such as 'S-note', in the home screen on the touch screen 190.

In step 1620, the status of the mobile apparatus is determined by the controller 110. The status of the mobile apparatus includes at least one of the latest status of the application, a status of a neighboring application or a neighboring widget, a status including at least one of time, a position and information on a user's log, a status of connection with an external apparatus, a status of a finger input or an electronic pen input, and a sensor based status.

For example, the controller 110 can recognize the status of the finger input or the electronic pen input which corresponds to the status of the mobile apparatus 100. The controller 110 can recognize the status of the finger input as shown in FIG. 15B, and the status of the electronic pen input as shown in FIG. 16B.

The controller 110 can change the initial entry point of the shortcut icon to the changed entry point, in response to the finger input or the electronic pen input.

In step 1632, the controller 110 determines an absence or a presence of the finger input. When the presence of the finger input is determined, the initial entry point of the shortcut icon is changed to the changed entry point in response to the finger input in step 1634. The entry point may be an action of the application which is executed as the shortcut icon is selected. The initial entry point may be an action for the execution of the application which remains in the initial status and is executed when the shortcut icon is selected. For example, the initial entry point may be an action for an execution of the Note application which remains in the initial status and is executed when the shortcut icon is selected.

The controller 110 can change the initial entry point of the shortcut icon to the changed entry point in response to the finger input. For example, the changed entry point corresponding to the finger input status may be an action for the execution of the Note application which remains in the initial status and is executed when the shortcut icon is selected. Accordingly, the controller 110 can change the initial entry point to the changed entry point in response to the finger input corresponding to the action for the execution of the Note application which remains in the initial status.

Meanwhile, the changed entry point corresponding to the finger input status may be an action for allowing a finger to input a touch on the touch screen. Accordingly, the controller 110 can change the initial entry point to the changed entry point which corresponds to the finger input status corresponding to the action for allowing the finger to input the touch on the touch screen.

Alternatively, when the absence of the finger input status is determined, the controller 110 determines an absence or a presence of the electronic pen input in step 1636. When the presence of the electronic input pen is determined, the initial entry point of the shortcut icon is changed to the changed entry point in response to the electronic pen input in step 1638. However, when the absence of the electronic pen input is determined, the execution of the application is terminated.

The entry point may be an action of the application which is executed when the shortcut icon is selected. The initial entry point may be an action for the execution of the application which remains in the initial status and is executed when the shortcut icon is selected. For example, the initial entry point may be an action for the execution of the Note application which stays in the initial status and is executed when the shortcut icon is selected.

At this time, the controller 110 can change the initial entry point of the shortcut icon to the changed entry point according to the status of the electronic pen input. For example, the changed entry point corresponding to the status of the electronic pen input may be an action for the execution of the application which remains in the latest status when the execution of the application is terminated. In a case of the Note application, the latest status of the Note application may be the status in which the 'Note A' was written. Accordingly, the controller can change the initial entry point of the shortcut icon to the changed entry point in correspondence with the status in which the 'Note A' is written. That is, the controller 110 can change the initial entry point to the changed entry point in response to the electronic pen input corresponding to the action for the execution of the 'Note A' which is written.

Also, the changed entry point corresponding to the electronic pen input may be an action for preventing the finger from performing the touch input on the touch screen while allowing only the electronic pen to input a touch on the touch screen. Accordingly, the controller 110 can change the initial entry point to the changed entry point in response to the electronic pen input corresponding to the action for preventing the finger from performing the touch input while allowing the electronic pen to input a touch on the touch screen.

In step 1640, a gesture for the execution of the shortcut icon is detected by the controller 110.

For example, the execution gesture may be a touch to the shortcut icon on the touch screen 190. Accordingly, the controller 110 can detect the touch to the shortcut icon on the touch screen 190, which corresponds to the execution gesture. As shown in FIG. 15B or 16B, the controller 110 can detect the touch of the finger or electronic pen to the shortcut icon on the touch screen 190, which corresponds to the execution gesture.

in step 1650, when the execution gesture is detected, the controller 110 can execute the Note application by the changed entry point. The changed entry point may be an action for the execution of the Note application. Accordingly, the controller 110 can execute the Note application by the action for the execution of the Note application which remains in the initial status, as shown in FIG. 15C. That is, the controller 110 can execute the Note application by the action for the execution of the Note application which remains in the initial status, when the shortcut icon is executed, as shown in FIG. 15B.

According to the embodiment of the present invention, the changed entry point may be an action for allowing a finger to input a touch on the touch screen. Accordingly, the controller 110 can executed the Note application by the action for allowing the finger to input the touch on the touch screen.

According to the embodiment of the present invention, the changed entry point may be an action for the execution of the application which remains in the latest status after the application is completed. In this scenario, in a case of the Note application, the latest status of the Note application may be, for example, the status in which the 'Note A' was written. Accordingly, the controller 110 can execute the Note application by the action for the execution of the 'Note A' which was written, as shown in FIG. 16C.

According to the embodiment of the present invention, the changed entry point may be an action for preventing the finger from inputting a touch on the touch screen while allowing the electronic pen to input a touch. Accordingly, the controller 110 can execute the Note application by the action for preventing the finger from inputting the touch on the touch screen while allowing the electronic pen to input the touch.

According to another embodiment of the present invention, there is an advantage in that the initial entry point of the shortcut icon can be changed to the changed entry point in correspondence with the input by the finger or the electronic pen. According to another embodiment of the present invention, there is an advantage in that the application can be executed by the changed entry point in correspondence with the input by the finger or electronic pen when the execution gesture for the execution of the shortcut icon is detected.

FIGS. 17A to 18C are views showing screens in which a method of controlling a mobile apparatus to provide a changed shortcut icon corresponding to a status of the mobile apparatus is executed according to another embodiment of the present invention.

Referring to FIG. 7 again, the method of controlling the mobile apparatus which provides the changed shortcut icon corresponding to the status of the mobile apparatus according to another embodiment of the present invention, in step 1310, the shortcut icon for the execution of the application is displayed, by the controller 110, on the display unit in the mobile application. Referring to FIGS. 17A and 18A, the controller 110 can display a shortcut icon 270 for an execution of an application for an adjustment of brightness on the display unit formed with the touch screen 190. At this time, the controller 110 can display the shortcut icon 270 for the execution of the application for the adjustment of the brightness in the home screen on the touch screen 190. The shortcut icon 270 may include an image and a text. As shown in FIGS. 17A and 18A, the controller 110 can display the shortcut icon 270, which includes an image having 'Auto adjust' indicated therein, and a text such as 'Brightness', in the home screen on the touch screen 190.

In step 1320, the status of the mobile apparatus is determined by the controller 110. The status of the mobile apparatus includes at least one of the latest status of the application, a status of a neighboring application or a neighboring widget, a status including at least one of time, a position and information on a user's log, a status of connection with an external apparatus, a status of a finger input or an electronic pen input, and a sensor based status.

For example, the controller 110 can recognize a sensor based status corresponding to the status of the mobile apparatus 100 such as a status of sensing an illuminance. The controller 110 can recognize the sensor based status in which the illuminance is sensed by using an illuminance sensor 170a included in the mobile apparatus, as shown in FIGS. 17A and 18A.

For example, the controller 110 can recognize that the illuminance is lower than a predetermined critical value by using the illuminance sensor 170a. Alternatively, the controller 110 can recognize that the illuminance is higher than the predetermined critical value by using the illuminance sensor 170a.

In step 1330, the initial entry point of the shortcut icon is changed to the changed entry point by the controller 110 in correspondence with the status. The entry point may be an action of the application which is executed as the shortcut icon is selected. The initial entry point may be an action for the execution of the application which remains in the initial status and is executed when the shortcut icon is selected. For example, the initial entry point may be an action for an execution of the application for the adjustment of brightness which remains in the initial status and is executed when the shortcut icon 270 is selected, as shown in FIG. 17A or 18A.

The controller 110 can change the initial entry point of the shortcut icon to the changed entry point, corresponding to the status. For example, the status of the mobile apparatus may be a status of sensing the illuminance, which corresponds to the sensor based status. Accordingly, the changed entry point may be an action relating to the status of sensing the illuminance.

For example, in a case that the illuminance is higher than the predetermined critical value, the controller 110 decreases the brightness, and changes the initial entry point of the shortcut icon to the changed entry point by the action for the execution of the application for adjusting the brightness. Alternatively, in a case that the illuminance is lower than the predetermined critical value, the controller 110 increases the brightness, and changes the initial entry point of the shortcut icon to the changed entry point by the action for the execution of the application for adjusting the brightness.

In step 1335, the shortcut icon having a shape changed to correspond to the changed entry point is displayed by the controller 110 on the display unit 1335.

The shortcut icon 270 may include an image and a text. For example, as shown in FIG. 17A or 18A, the controller 110 can display the shortcut icon 270 including an image in which a text such as 'Auto adjust' is shown, and a text such as 'Brightness' in the home screen on the touch screen 190.

The controller 110 can change the shape of the shortcut icon 270 by reflecting the changed entry point. For example, when it is determined that the illuminance is higher than the predetermined critical value, the changed entry point may be an action for the execution of the application for adjusting the brightness, which decreases the brightness. Accordingly, the controller 110 can change the text of 'Auto adjust' included in the image of the shortcut icon 270, to 'Decrease' 272 to reflect the changed entry point. As shown in FIG. 17B, the controller 110 can display the shortcut icon, which has a shape changed and in which the text included in the image of the shortcut icon 270 is changed to 'Decrease' 272, on the display unit.

Alternatively, when it is determined that the illuminance is lower than the predetermined critical value, the changed entry point may be an action for the execution of the application for adjusting the brightness, which increases the brightness. Accordingly, the controller 110 can change the text of 'Auto adjust' included in the image of the shortcut icon 270 to 'Increase' 275 to reflect the changed entry point. As shown in FIG. 18B, the controller 110 can display the shortcut icon, which has a shape changed and in which the text included in the image of the shortcut icon 270 is changed to 'Increase' 275, on the display unit.

In step 1340, a gesture for the execution of the shortcut icon is detected by the controller 110.

For example, the execution gesture may be a touch to the shortcut icon on the touch screen 190. Accordingly, the controller 110 can detect the touch to the shortcut icon on the touch screen, which corresponds to the execution gesture. For example, as shown in FIG. 17B or 18B, the controller 110 can detect the touch to the shortcut icon 272 or 275 on the touch screen 190, which corresponds to the execution gesture.

In step 1350, when the execution gesture is detected, the application is executed by the controller 110 using the changed entry point in step 1350.

For example, in FIG. 17B, when the touch to the shortcut icon is detected, the controller 110 can execute the application for the adjustment of the brightness using the changed entry point. The changed entry point may be an action for the execution of the application for the adjustment of the brightness, which decreases the brightness. Accordingly, the controller 110 can decrease the brightness from 273 to 274, so as to execute the application for the adjustment of the brightness as shown in FIG. 17C. That is, the controller 110 allows a user to move a brightness adjustment tab in a direction to a left of a brightness adjustment bar, i.e. from 273 to 274 (a maximum brightness at a right end, and a minimum brightness at a left end) so as to decrease the brightness as shown in FIG. 17C.

Alternatively, in FIG. 18B, when the touch to the shortcut icon is detected, the controller 110 can execute the application for the adjustment of the brightness by the changed entry point. At this time, the changed entry point may be an action for the execution of the application for the adjustment of the brightness, which increases the brightness. Accordingly, as shown in FIG. 18C, the controller 110 increases the brightness so as to execute the application for the adjustment of the brightness. That is, the controller 110 allows a user to move the brightness adjustment tab in a direction to a right of the brightness adjustment bar, i.e. from 276 to 277 (a maximum brightness at a right end, and a minimum brightness at a left end) so as to increase the brightness as shown in FIG. 18C.

According to another embodiment of the present invention, there is an advantage in that the application can be executed by the changed entry point in correspondence with the mobile apparatus. According to another embodiment of the present invention, there is an advantage in that the application can be immediately executed by the changed entry point which corresponds to the sensor based status which is one of the statuses of the mobile apparatus. According to another embodiment of the present invention, there is an advantage in that the application for the adjustment of the brightness can be immediately executed by the changed entry point which increases or decreases the brightness in correspondence with the status based on the sensor for sensing the illuminance.

Figure 19:
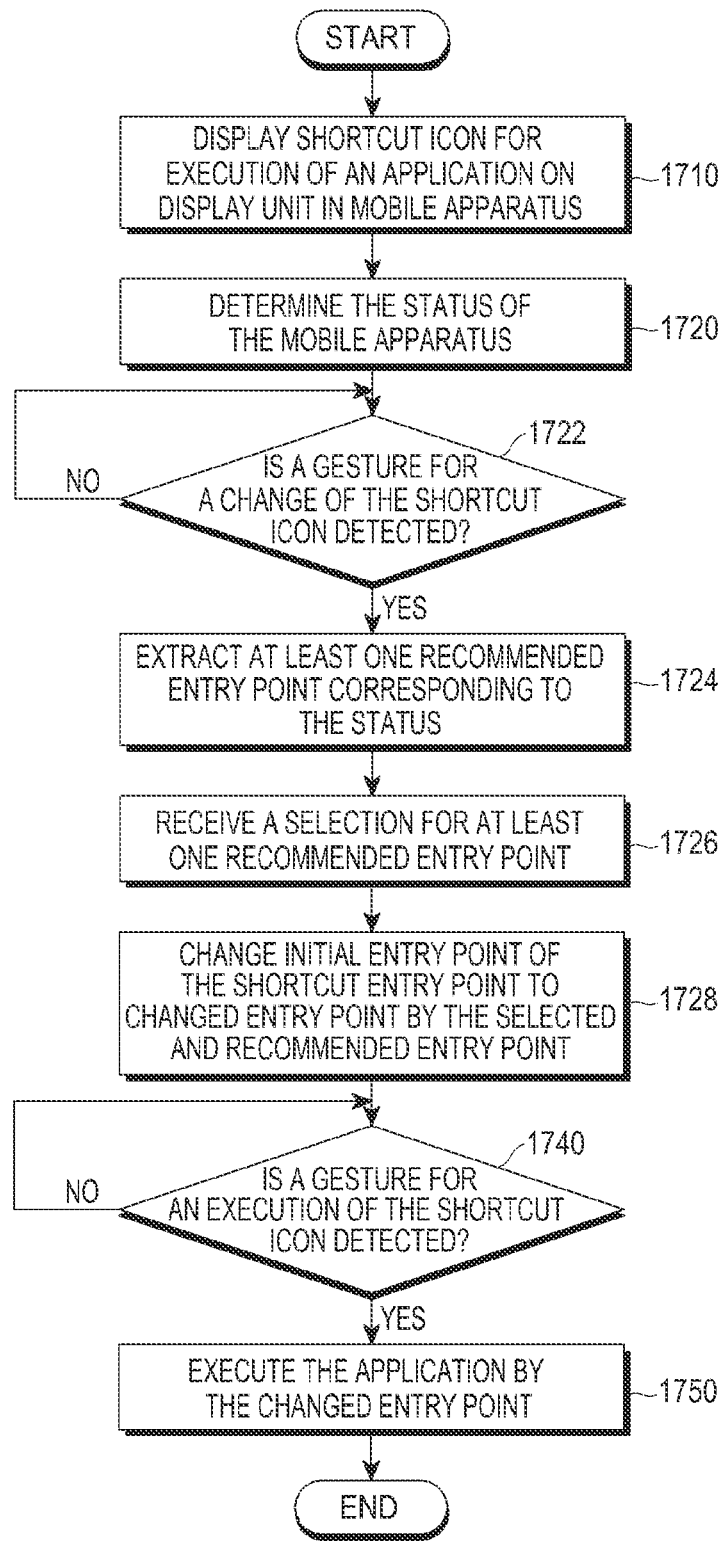
FIG. 19 is a flowchart illustrating a method of controlling a mobile apparatus to provide a changed shortcut icon corresponding to a status of the mobile apparatus according to another embodiment of the present invention.

FIG. 19 is a flowchart illustrating a method of controlling a mobile apparatus to provide a changed shortcut icon corresponding to a status of the mobile apparatus according to another embodiment of the present invention. FIGS. 20A to 20D are views showing screens in which the method of controlling the mobile apparatus to provide the changed shortcut icon corresponding to the status of the mobile apparatus is executed according to the embodiment of the present invention.

Referring to FIG. 19, in step 1710, the shortcut icon for the execution of the application is displayed, by the controller 110, on a display unit in the mobile apparatus. The application is an application program created to implement a predetermined task. The shortcut icon corresponds to an icon displayed to execute the application. For example, the shortcut icon may be an icon displayed on the home screen in order to execute the application. Referring to FIG. 20A, the controller 110 can display a shortcut icon 280 for execution of a Note application on the display unit formed with the touch screen 190. The controller 110 can display the shortcut icon 280 for the execution of the Note application in the home screen on the touch screen 190. The shortcut icon 280 may include an image 282 and a text 284.

In step 1720, the status of the mobile apparatus is determined by the controller 110 The status of the mobile apparatus includes at least one of the latest status of the application, a status of a neighboring application or a neighboring widget, a status including at least one of time, a position and information on a user's log, a status of connection with an external apparatus, a status of a finger input or an electronic pen input, and a sensor based status.

In step 1722, a gesture for changing the shortcut icon is detected by the controller 110.

For example, the change gesture may be a touch to the shortcut icon on the touch screen 190. Accordingly, the controller 110 can detect the touch to the shortcut icon on the touch screen 190, which corresponds to the change gesture. For example, as shown in FIG. 20A, the controller 110 can detect a touch 300 to the shortcut icon 280 on the touch screen 190 corresponding to the change gesture.

When the change gesture is detected, at least one recommended entry point corresponding to the status is extracted by the controller 110 in step 1724.

For example, the controller 110 can extract at least one recommended entry point corresponding to the status such as, for example, a menu status of the application. The menu status of the application relates to menu items of the application. For example, in a case of the Note application, the menu item may include a search item, a new note creation item, and an item for an execution of a previously written note. Accordingly, the controller 110 can extract an action for executing the search item, an action for executing a creation of a new note, or an action for executing a previously written note such as, for example, note A and note B, by at least one recommended entry point corresponding to the menu status of the Note application.

In step 1726, at least one recommended entry point is selected and input. The controller 110 can receive a selection of at least one recommended entry point.

For example, the controller 110 can display at least one recommended entry point, which is extracted in correspondence with the status, on the touch screen 190. The controller 110 can receive a selection of at least one displayed and recommended entry point. The controller 110 can detect a touch to the at least one recommended entry point and receive the selection of the recommended entry point.

Referring to FIG. 20B, the controller 110 can display at least one recommended entry point, which is extracted in correspondence with the status, on the touch screen 190. For example, the controller 110 can display an action 287 for executing a search item, an action 286 for executing a creation of a new note, an action 288 for executing a previously written note A, and/or an action 289 for executing a previously written note B, which correspond to at least one recommended entry point, on the touch screen. The controller 110 can receive a selection of the at least one displayed and recommended entry point. At this time, the controller 110 can detect a touch, for example drag, to at least one recommended entry point and receive the input selection. That is, as shown in FIG. 20B, the controller 110 can detect a drag 302 for the action of executing the new note creation. When the drag for the action of executing the new note creation is detected, the controller 110 receives a corresponding selection for the action of executing the new note creation.

In step 1728, the initial entry point of the shortcut icon is changed, by the controller 110, to the changed entry point by the selected and recommended entry point. The initial entry point may be an action for the execution of the application which remains in the initial status and is executed when the shortcut icon is selected. The controller 110 can change the initial entry point of the shortcut icon to the changed entry point by the selected and recommended entry point.

As shown in FIG. 20B, when the action 286 for the execution of the new note creation is selected and input, the controller 110 can change the initial entry point to the changed entry point by the action for the execution of the new note creation.

The controller 110 can change the shape of the shortcut icon to correspond to the selected and recommended entry point. For example, as shown in FIG. 20C, in correspondence with the action 286 for the execution of the new note creation which is the selected and recommended entry point, the original image 282 of the shortcut icon 280 is maintained, and the text 286 is changed from 'S-note' 284 to 'Create New' 286. Then, the image 282 and the text 286 are displayed on the touch screen. As shown in FIG. 20D, the controller 110 may remove at least one recommended entry point 284, 287, 288 and 289 except for the selected and recommended entry point, from the touch screen.

In step 1740, a gesture for the execution of the shortcut icon is detected by the controller 110.

For example, the execution gesture may be a touch to the shortcut icon on the touch screen 190. Accordingly, the controller 190 can detect the touch to the shortcut icon on the touch screen 190, which corresponds to the execution gesture. For example, as shown in FIG. 20D, the controller 110 can detect the touch to the shortcut icon 280 on the touch display 190, which corresponds to the execution gesture.

When the execution is detected, the application is executed by the controller 110 using the changed entry point in step 1750. For example, in FIG. 20D, when the touch to the shortcut icon is detected, the controller 110 can execute the Note application by the changed entry point. In this case, the changed entry point may be an action for the execution of the new note creation. Accordingly, the controller 110 can execute the Note application by the action for the execution of the new note creation. That is, the controller 110 can immediately execute the Note application by the action for the execution of the new note creation when the shortcut icon is executed, as in FIG. 20D.

According to another embodiment of the present invention, in a case of the Note application, at least one recommended entry point can be displayed on the touch screen. When at least one recommended entry point is selected and input, the initial entry point of the shortcut icon can be changed to the changed entry point by the action for the execution of the new note creation. When the shortcut icon is executed, the Note application can be immediately executed by the action for the execution of the new note creation, which is the changed entry point. Accordingly, when the shortcut icon is executed, the application may not always be executed by the initial entry point, but instead by the changed entry point selected by the user.

According to another embodiment of the present invention, there is an advantage in that at least one recommended entry point which corresponds to the status of the mobile apparatus is selected and input, and the initial entry point of the shortcut icon can be changed to the selected and recommended entry point. Therefore, the user can easily change the entry point of the shortcut icon through a simple gesture. Also, the application can be immediately executed by the changed entry point.

According to an embodiment of the present invention, there is an advantage in that a function can be executed by using a changed entry point to correspond to a status of an apparatus.

According to the embodiment of the present invention, there is another advantage in that an application can be immediately executed by using a changed entry point corresponding to a latest status of the application which corresponds to the status of the mobile apparatus.

According to another embodiment of the present invention, there are advantages in that an application can be executed by using a changed entry point, and that an application can be executed by replacing the changed entry point with an initial entry point when an initialization of the application is detected.

According to still another embodiment of the present invention, there is an advantage in that a shortcut icon having a changed shape corresponding to a changed entry point according to a status of the mobile apparatus can be displayed.

According to still another embodiment of the present invention, there is an advantage in that an application can be immediately executed by using a changed entry point corresponding to a status of a neighboring application or a neighboring widget, which corresponds to the status of the mobile apparatus.

According to yet still another embodiment of the present invention, there is an advantage in that when a selection for at least one recommended entry point corresponding to a status of a mobile apparatus input, an initial entry point of a shortcut icon can be replaced with the selected recommended entry point It will be appreciated that the embodiments of the present invention may be implemented in the form of hardware, software, or a combination of hardware and software. Any such software may be stored in a volatile or non-volatile storage device such as a ROM (Read-Only Memory), or in a memory such as a RAM (Random Access Memory), a memory chip, a memory device or a memory integrated circuit, or in a storage medium, such as a CD (Compact Disc), a DVD (Digital Versatile Disc), a magnetic disk or a magnetic tape, which is optically or magnetically recordable and simultaneously, is readable by a machine (for example, a computer), regardless of whether the software can be deleted or rewritten. It will be appreciated that the method for controlling the apparatus for measuring coordinates of input from an input means according to the present invention may be implemented by a computer or a portable terminal including a controller and a memory, and that the memory is an example of a non-transitory machine-readable storage medium suitable for storing a program or programs including instructions for implementing the embodiments of the present invention. Accordingly, the present invention includes a program including codes for implementing an apparatus or a method which is claimed herein, and a storage medium which stores this program and is readable by a machine (a computer or the like). Also, this program may be electronically conveyed via any medium such as a communication signal transmitted through a wired or wireless connection, and the present invention suitably includes equivalents of this program.

Further, the mobile apparatus receives and stores the program from a program providing apparatus connected by wire or wireless thereto. The program providing apparatus includes a program having instructions for performing the embodiments of the present invention, a memory for storing information necessary to perform the embodiments of the present invention, a communication unit for performing a wired or wireless communication with the mobile apparatus, and a controller for transmitting the corresponding program to a transceiver in response to a request of the mobile apparatus or automatically.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of controlling a mobile apparatus which provides a changed shortcut icon corresponding to a status of the mobile apparatus, the method comprising:
    displaying a shortcut icon, corresponding to a function of the mobile apparatus, on a display unit;
    recognizing the status of the mobile apparatus;
    changing an initial entry point of the shortcut icon to a changed entry point in correspondence with the status;
    displaying a changed shortcut icon, which has a shape changed to correspond to the changed entry point, on the display unit;
    detecting an execution gesture for executing the shortcut icon; and
    executing the function using the changed entry point.

2. The method as claimed in claim 1, wherein the function is an application.

3. The method as claimed in claim 2, wherein the status of the mobile apparatus includes at least one of a latest status of the application, a status of a neighboring application or a neighboring widget, a status including at least one of time, a position and information on a user's log, a status of connection with an external apparatus, a status of a finger input or an electronic pen input, and a sensor based status.

4. The method as claimed in claim 1, further comprising:
    detecting an initialization of an application;
    changing the changed entry point of the shortcut icon to the initial entry point;
    detecting a gesture for executing the shortcut icon; and
    executing the application using the initial entry point.

5. The method as claimed in claim 1, wherein the changed shortcut icon has an identical image to the shortcut icon, and a text changed to reflect the changed entry point.

6. The method as claimed in claim 1, wherein the status of the mobile apparatus includes a status of a neighboring application or a neighboring widget, and changing the initial entry point of the shortcut icon to the changed entry point according to the status further comprises:
    detecting an action which is executed in the neighboring application or the neighboring widget; and
    changing the initial entry point of the shortcut icon to the changed entry point in response to the action.

7. The method as claimed in claim 1, wherein the status of the mobile application includes a status of a connection with an external apparatus, and changing the initial entry point of the shortcut icon to the changed entry point according to the status further comprises:
    extracting information on a user's log; and
    changing the initial entry point of the shortcut icon to the changed entry point as a function of the information on the user's log.

8. The method as claimed in claim 1, wherein the status of the mobile apparatus includes a status of a finger input or an electronic pen input, and changing the initial entry point of the shortcut icon to the changed entry point according to the status further comprises:
    changing the initial entry point of the shortcut icon to the changed entry point as a function of the status of the finger input or the electronic pen input.

9. The method as claimed in claim 1, further comprising:
    detecting a change gesture for changing the shortcut icon;
    extracting at least one recommended entry point corresponding to the status of the mobile apparatus, when the change gesture is detected; and
    receiving a selection for one of the at least one recommended entry point,
    wherein in changing the initial entry point of the shortcut icon to the changed entry point according to the status, the initial entry point of the shortcut icon is changed to the changed entry point by the selected and recommended entry point.

10. An apparatus for providing a changed shortcut icon corresponding to a status of the apparatus, the apparatus comprising:
    a display unit configured to display a shortcut icon; and
    a controller configured to control the display unit to display the shortcut icon, which corresponds to a function, to recognize the status of the mobile apparatus, to change an initial entry point to a changed entry point in correspondence with the status, to display a changed shortcut icon, which has a shape changed to correspond to the changed entry point, on the display unit, to detect a gesture for an execution of the shortcut icon, and to execute the function using the changed entry point.

11. The apparatus as claimed in claim 10, wherein the function is an application.

12. The apparatus as claimed in claim 11, wherein the status of the mobile apparatus includes at least one of a latest status of the application, a status of a neighboring application or a neighboring widget, a status including at least one of time, a position and information on a user's log, a status of connection with an external apparatus, a status of a finger input or an electronic pen input, and a sensor based status.

13. The apparatus as claimed in claim 10, wherein the controller is configured to detect an initialization of an application, to change the changed entry point of the shortcut icon back to the initial entry point to detect a gesture for an execution of the shortcut icon, and to execute the application using the initial entry point.

14. The apparatus as claimed in claim 10, wherein the changed shortcut icon has an identical image to the shortcut icon, and a text changed to reflect the changed entry point.

15. The apparatus as claimed in claim 10, wherein the status of the mobile apparatus includes a status of a neighboring application or a neighboring widget, and in the changing of the initial entry point of the shortcut icon to the changed entry point according to the status, the controller detects an action which is executed in the neighboring application or the neighboring widget, and changes the initial entry point of the shortcut icon to the changed entry point in response to the action.

16. The apparatus as claimed in claim 10, wherein the status of the mobile application includes a status of a connection with an external apparatus, and in the changing of the initial entry point of the shortcut icon to the changed entry point according to the status, the controller extracts information on a user's log when the external apparatus is connected to the mobile apparatus, and changes the initial entry point of the shortcut icon to the changed entry point as a function of the information on the user's log.

17. The apparatus as claimed in claim 10, wherein the status of the mobile apparatus includes a status of a finger input or an electronic pen input, and in the changing of the initial entry point of the shortcut icon to the changed entry point according to the status, the controller changes the initial entry point of the shortcut icon to the changed entry point as a function of the status of the finger input or the electronic pen input.

18. The apparatus as claimed in claim 10, wherein the controller detects a change gesture for changing the shortcut icon, extracts at least one recommended entry point corresponding to the status of the mobile apparatus, when the change gesture is detected, and receives a selection for one of the at least one recommended entry point, and wherein in the changing of the initial entry point of the shortcut icon to the changed entry point according to the status, the controller changes the initial entry point of the shortcut icon to the changed entry point by the selected and recommended entry point.

\* \* \* \* \*